US010964156B2

(12) United States Patent
Strand

(10) Patent No.: US 10,964,156 B2
(45) Date of Patent: Mar. 30, 2021

(54) REEL-BASED WAGERING GAMES

(71) Applicant: King Show Games Inc., Minnetonka, MN (US)

(72) Inventor: Ryan Strand, Hopkins, MN (US)

( * ) Notice: Subject to any disclaimer, the term of this patent is extended or adjusted under 35 U.S.C. 154(b) by 246 days.

(21) Appl. No.: 15/971,197

(22) Filed: May 4, 2018

(65) Prior Publication Data

US 2018/0322727 A1 Nov. 8, 2018

Related U.S. Application Data

(60) Provisional application No. 62/501,509, filed on May 4, 2017.

(51) Int. Cl.

| | |
|---|---|
| ***A63F 13/00*** | (2014.01) |
| ***G07F 17/32*** | (2006.01) |
| ***G06Q 50/34*** | (2012.01) |
| ***G07F 17/34*** | (2006.01) |

(52) U.S. Cl.
CPC ......... *G07F 17/3213* (2013.01); *G06Q 50/34* (2013.01); *G07F 17/3209* (2013.01); *G07F 17/34* (2013.01)

(58) Field of Classification Search
CPC .. G07F 17/34; G07F 17/3213; G07F 17/3244; G07F 17/3267
See application file for complete search history.

(56) References Cited

U.S. PATENT DOCUMENTS

| | | | | |
|---|---|---|---|---|
| 5,720,662 | A * | 2/1998 | Holmes, Jr. | G07F 17/34 463/20 |
| 7,601,062 | B2 | 10/2009 | Cole et al. | |
| 7,618,315 | B2 | 11/2009 | Thomas et al. | |
| 7,625,280 | B2 | 12/2009 | Singer et al. | |
| 7,927,204 | B2 | 4/2011 | DeBrabander, Jr. et al. | |
| 8,075,392 | B2 | 12/2011 | Richardson | |
| 8,246,442 | B1 | 8/2012 | Barrie | |
| 8,298,065 | B2 | 10/2012 | Berman et al. | |
| 8,485,886 | B2 | 7/2013 | Muir | |
| 2004/0140618 | A1* | 7/2004 | Fox | G07F 17/3262 273/292 |
| 2004/0166924 | A1* | 8/2004 | Jackson | G07F 17/34 463/20 |
| 2006/0189376 | A1* | 8/2006 | Hornik | G07F 17/34 463/20 |

* cited by examiner

*Primary Examiner* — Omkar A Deodhar
*Assistant Examiner* — Eric M Thomas

(57) ABSTRACT

Reel-based wagering games and associated methods and gaming apparatuses are disclosed. Examples of reel-based wagering games comprise a number of reels and multiple paylines or a multi-way payout scheme associated with the number of reels. Evaluation of payouts associated with the multiple paylines or the multi-way payout scheme starts with a first reel to stop and resets at a subsequent reel to stop when the subsequent reel does not result in a payout with previously stopped reels.

20 Claims, 13 Drawing Sheets

REEL-BASED WAGERING GAMES

RELATED APPLICATION

This application claims priority under 35 U.S.C. § 119(e) to U.S. Provisional Patent Application No. 62/501,509, which is entitled "REEL-BASED WAGERING GAMES," was filed on May 4, 2017, and the disclosure of which is hereby incorporated by reference.

FIELD

The present disclosure relates to reel-based wagering games.

BACKGROUND

Casino games such as poker, slots, and craps have long been enjoyed for entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, in that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

Reel-based wagering games and associated methods and gaming apparatuses are disclosed. In some examples, a reel-based wagering game comprises a number of reels and multiple paylines or a multi-way payout scheme associated with the number of reels. Evaluation of payouts associated with the multiple paylines or the multi-way payout scheme starts with a first reel to stop and resets at a subsequent reel to stop when the subsequent reel does not result in a payout with previously stopped reels. Other examples also are disclosed herein.

DESCRIPTION

Figure 1:
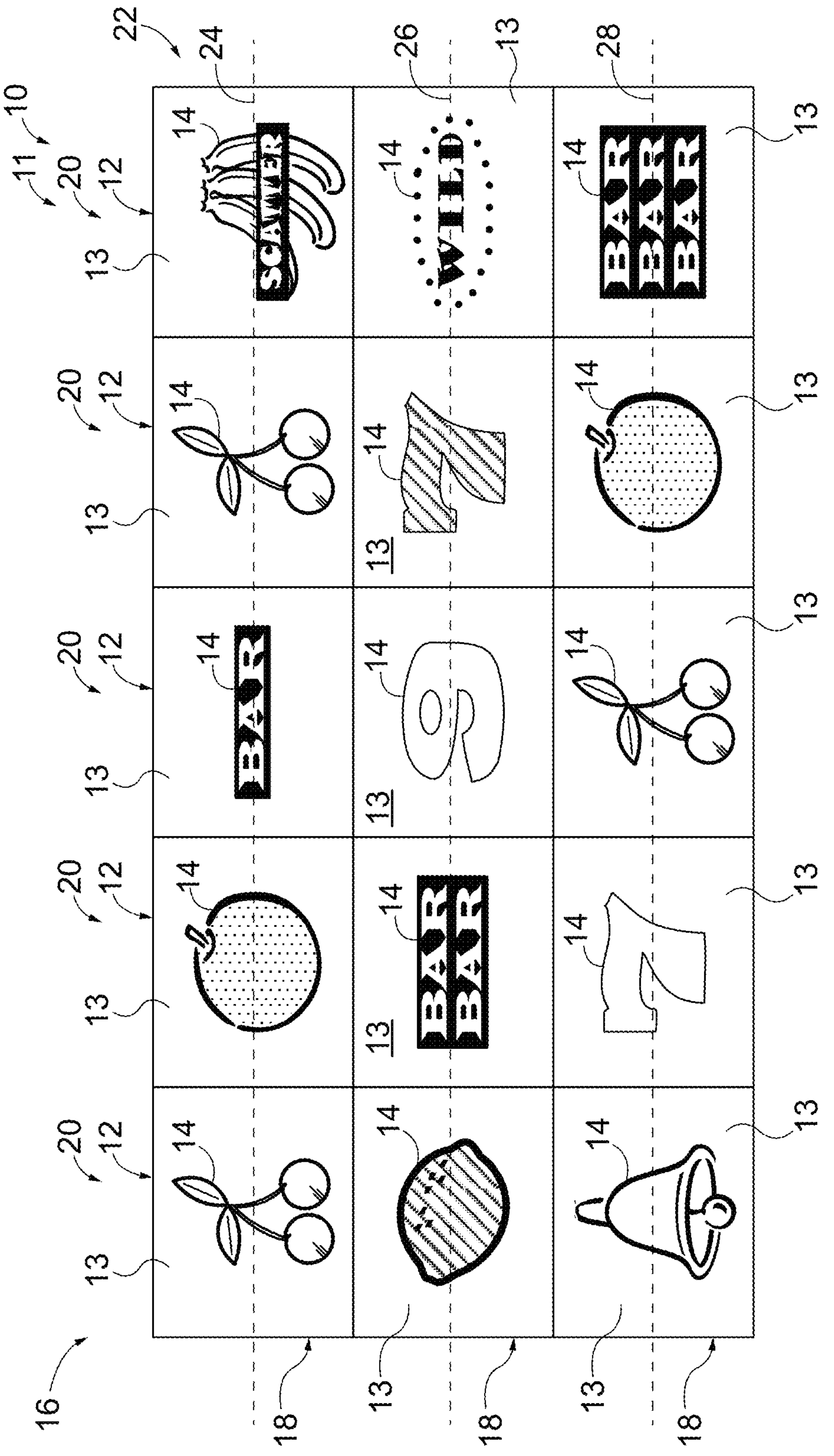
FIG. 1 is a representation of an example reel-based wagering game having five reels with multiple paylines.
Figure 2:
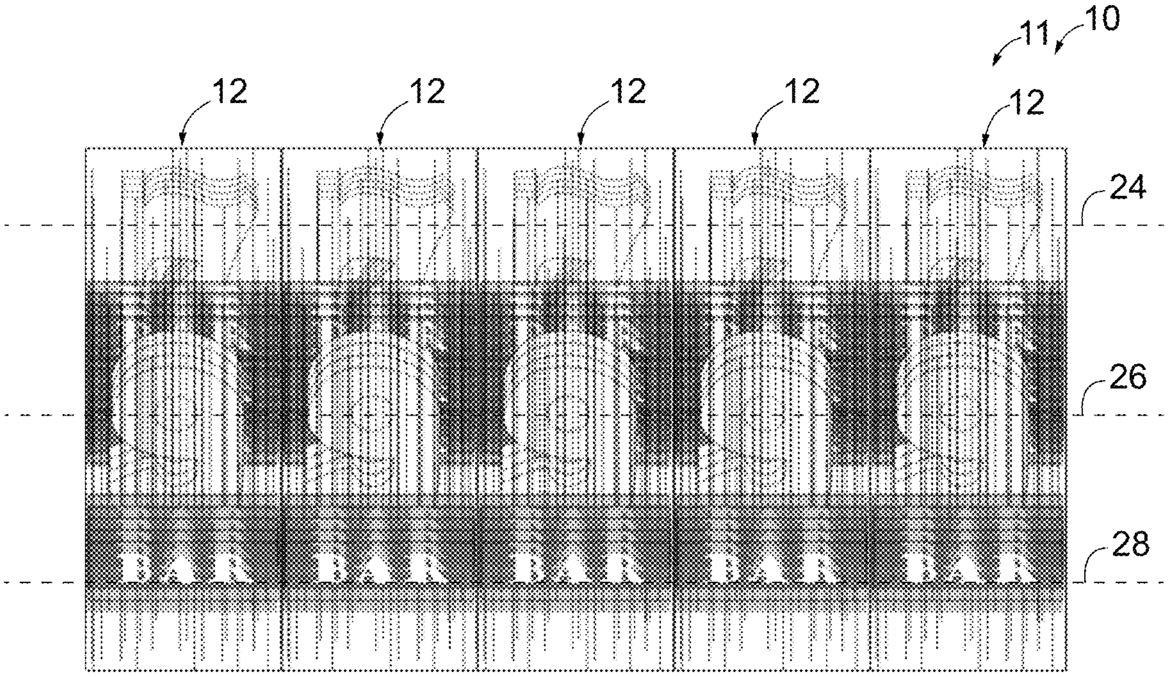
FIG. 2 is a representation of the example game of FIG. 1, with all five reels depicted in a changing state.
Figure 3:
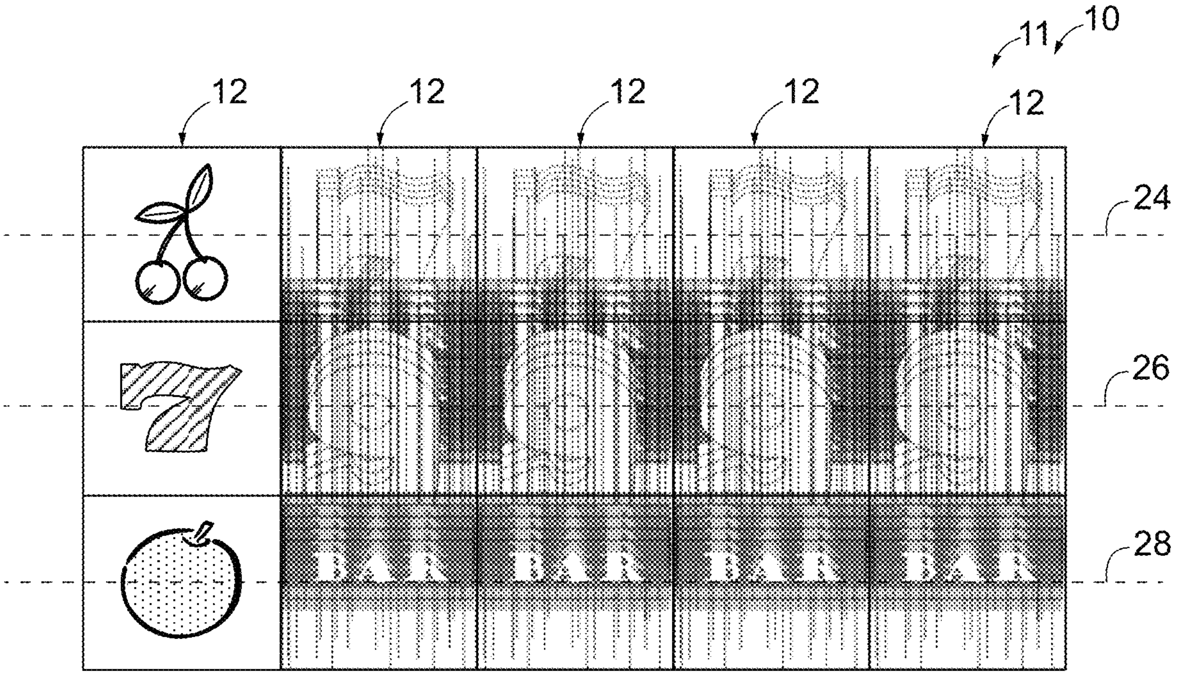
FIG. 3 is a representation of the example game of FIG. 1 in sequence with FIG. 2, with the left-most reel depicted in a stopped state.

In the following description of various exemplary embodiments, reference is made to the accompanying drawings which form a part hereof, and in which are shown by way of illustration representative embodiments in which the features described herein may be practiced. It is to be understood that other embodiments may be utilized, as structural and operational changes may be made without departing from the scope of the disclosure.

In the description that follows, the term "reels" and similar mechanically descriptive language may be used to describe various apparatus presentation features, as well as various actions occurring to those objects (e.g., "spin" and "stop"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as reels and the like may be simulated on a display in order to provide a familiar and satisfying experience that emulates the behavior of mechanical objects, as well as emulating actions that occur in non-computerized games (e.g., spinning and stopping reels). Further, a computerized version may provide the look of mechanical equivalents but may be generally randomized in a different way. Thus, the term "reel," for example, is intended to describe both physical reels and emulation or simulations of physical reels and their behaviors using electronic apparatus.

In various embodiments, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing one symbol with another symbol. Generally, such comparisons can be performed via software by mapping numbers (or other data structures such as character strings) to the symbols and performing the comparisons on the numbers/data structures.

Generally, the games and methods disclosed herein provide a player with two or more opportunities to win a discrete play of a game. Such games may be referred to as providing "second chance" opportunities, and the like. The games and methods disclosed herein may be implemented as a single game, or part of a multi-part game. For example, the game features disclosed herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g., slot game) are provided for purposes of facilitating an understanding of the features described herein. However, the principles described herein are equally applicable to any game of chance where an outcome(s) is determined for use in the player's gaming activity.

Reel-based wagering games and corresponding game methods are disclosed herein, with the reel-based wagering games indicated in the figures at 10 and generally referred to herein as reel-based wagering games 10, or just games 10. Reel-based wagering games 10 additionally or alternatively may be referred to as slots, video slots, slot games, slot machines, reel-based slot machines, and so forth. Games 10 may include any number of reels 12, with any number of symbols 14 associated with the reels 12. The presentation, representation, or display of a game 10 may be described as including a grid 16 of symbol positions 13, including two or more rows 18 and two or more columns 20, with individual columns 20 corresponding to individual reels 12, and with the displayed symbols 14 shown in the symbol positions 13 representing a subset of the total symbols 14 associated with all of the reels 12. The reels 12 may be displayed as stopped reels, with only a subset of symbols associated with a given reel being displayed. Additionally, the reels 12 may be displayed as changing reels, with the symbols associated with a given reel moving, such as in connection with a spinning reel in mechanical examples, or simply as changing symbols, whether simulating a mechanical reel or representing random or other representation of symbols.

In mechanical examples, the game reels 12 may include physical reel strips where game symbols 14 are shown in images fixed on the reel strips. Virtual reel strips may be mapped to these physical reel positions shown on the reel strips to expand the range or diversity of game outcomes. In video slot examples, reel strips may be encoded in a memory or database, and virtual reels may be used for the game reels with images representing the data related to the reel strips. In other slot machine embodiments, each symbol position 13 on the grid 16 may be associated with an independent reel strip. In yet other slot machine embodiments, reels and/or reel strips may not be used at all in determining the symbols shown in the symbol positions 13 of the grid. For example, a symbol 14 may be randomly selected for each symbol position 13 within the grid 16, or the symbols 14 may be determined in part by game events occurring during game play, such as displayed elements in the symbol positions 13 being replaced by new game elements or symbols. Numerous variations are possible for implementing slot-type game play.

The example games 10 illustrated in FIGS. 1-19 have a grid 16 representing three rows 18 of symbols 14 from five reels 12, resulting in a total of fifteen displayed symbols 14 when all five reels 12 are stopped, and are referred to herein as games 11; however, the features of example games 11 discussed herein may be applied to games 10 having any size of grid 16 with any number and configuration of paylines 22.

Payout schemes associated with slots may include evaluations of symbol combinations associated with paylines, scatter pays, multi-way pays, or other types of symbol combination evaluation methods. In payline based slot games, payout schemes are often associated with one or more paylines 22, where each payline 22 corresponds to a predetermined arrangement or combination associated with predetermined symbol positions 13 within a game's grid 16. To ascertain whether a payout condition exists for a given game outcome, the game symbols 14 within the symbol positions 13 associated with a particular payline 22 may be evaluated to determine if a symbol combination is present that matches an entry in a paytable with an associated award. Any number of paylines 22 may be utilized in a game 10 according to the present disclosure, and for simplicity, games 11 are shown having three paylines 22. More specifically, with respect to example games 11, a payline 24 is associated with the upper row 18 of symbols 14, payline 26 is associated with the middle row 18 of symbols 14, and payline 28 is associated with lower row 18 of symbols 14.

Although embodiments of games 10 that utilize paylines 22 as part of their payout schemes are described below in detail, other embodiments may use different payout schemes while still benefitting from the concepts described herein. For example, in embodiments where a game 10 utilizes multi-way payout schemes, similar principles of beginning the symbol combination evaluations at different starting points among the respective game reels 12 may be used. Thus, while the below description focuses on embodiments that utilize payline evaluation payout schemes, multi-way or other payout schemes may use similar techniques and are contemplated, as well.

With the above as a framework, some games 10 may be described as comprising X game reels 12, where X is an integer greater than or equal to 3. Thus, for example with respect to the example game 11 depicted in the drawings, X equals five. Games 10 also may be described as comprising multiple paylines 22, with each payline associated with a distinct number of symbol positions 13 of game symbols 14 when the game reels 12 are stopped. In some games 10, the different payout schemes may be triggered based on the number of matching or predetermined arrangement of game symbols aligned along a distinct payline, for example, with a first set of matching or predetermined arrangement of game symbols resulting in a higher payout than a second set having fewer matching or predetermined arrangement of game symbols than the first set.

Historically, most reel-based wagering games evaluate symbol combinations starting at the left-most game reel and then proceeding to the right ("left to right paying games"), although other games may evaluate symbol combinations beginning on the right-most reel and then proceeding to the left ("right to left paying games") or evaluate both left to right and right to left ("both way paying games"). Although left to right paying game embodiments are described below, the described evaluation techniques similarly could be used for right to left paying game embodiments or both way paying game embodiments. For left to right paying game embodiments, the games generally only payout if the left-most stopped reel has at least one symbol that initiates or begins a symbol combination associated with an award in a paytable. Accordingly, after the second left-most reel stops, if no symbols of the second left-most stopped reel match or correspond to symbols on the left-most game reel along a payline (or within the entire left-most game reel for a multi-way pay evaluation game embodiment), then no payouts from the payline (or multi-way pay) evaluations can occur, and a player may lose interest in the game. This may be particularly true with games having five, six, or more total reels, because the player must wait for the rest of the game reels to stop to start a new play, even though no payout from the paylines (or multi-way pays) has already been determined.

Games 10, on the other hand, effectively reset the beginning of a payline 22 (or beginning reel for a multi-way pay evaluation payout scheme) after a stopped reel no longer leads to a payout condition. For example, in the sequence of FIGS. 2-4, following the left-most reel not including any symbols that match corresponding symbols of the second left-most reel along a payline, the second left-most reel then becomes the start of the payline for subsequent determinations of a payout, such as resulting in a payout associated with the sequence of FIGS. 2-4, 7, 9, and 10. As a result, a player of game 11 will remain interested in the game as it continues to be played.

For simplicity and when referring to example game 11, a win, or payout, condition results when three or more identical symbols are aligned in sequence along a payline 22. However, as understood in the art of reel-based games, other predetermined arrangements of symbols, including arrangements of more or less identical symbols, or combinations using non-identical symbols, may result in a win condition of a game 10.

Figure 4:
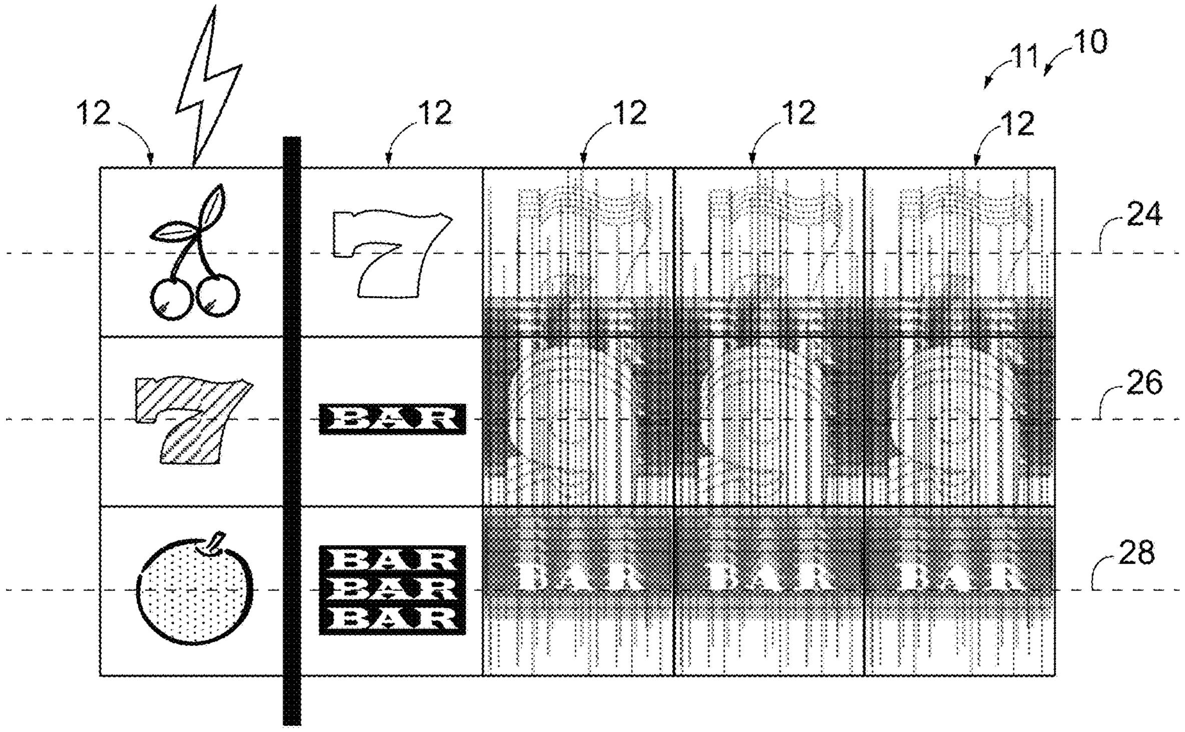
FIG. 4 is a representation of the example game of FIG. 1 in sequence with FIGS. 2-3, with the two left-most reels depicted in stopped states, and with the left-most reel not leading to a payout condition.

In some games 10, the game is configured to alert a player when a stopped reel cannot lead to, or does not result in, a payout. Additionally or alternatively, the game is configured to alert a player when a change in payout condition has occurred and/or when a payout condition is altered by the game as a result of a stopped reel not leading to a payout. Such an alert additionally or alternatively may be described as alerting the player when a subsequently stopped reel resets a payline or multi-way payout scheme, for example, to maintain the player's attention despite a prior stopped reel not leading to a payout. Stated differently, the player is alerted when the player is provided with a subsequent opportunity for a payout, despite a prior opportunity not having been fulfilled. Such an alert may take the form of a visual alert and/or an audible alert. For example, with reference to the sequence of FIGS. 2-4, first, all five reels 12 may initially be changing reels (FIG. 2), second, the left-most reel may stop and display three symbols (FIG. 3), and third, the second left-most reel may stop and display three symbols (FIG. 4). Because none of the symbols displayed on the second left-most reel are identical to the directly adjacent symbols of the left-most reel (i.e., along a payline 22), the left-most reel cannot lead to a payout condition in the depicted example of game 11, but the second left-most reel may still lead to a payout. In the example illustrated in FIG. 4, two optional forms of visual alerts are presented, including the display of a lightning bolt associated with the left-most reel (e.g., visually indicating a "strike") and including the display of a vertical line between the left-most reel and the second left-most reel (e.g., visually indicating a reset, or new start, of the paylines). However, other forms of visual alerts may be used, including only one of the example alerts presented in the figures herein, as well as any other suitable form of visual and/or audible alert. By alerting the player that a set of paylines does not trigger a payout and/or that the payline is effectively reset for a subsequent opportunity of a payout, the player versed in the elements of the game will understand that to achieve a payout, subsequent reels will need to lead to a payout condition to result in a win, or payout. In some examples, the visual alert may remain for the duration of a discrete game play, such as with the example vertical line shown in the sequence of FIGS. 4, 7, 9, and 10 and in the alternative sequence of FIGS. 4, 7, 9, and 11. In other examples, the visual alert may remain for less than the duration of a discrete game play, such as only until a subsequent reel stops, for example, as shown in connection with the lightning bolt only appearing in FIG. 4 in the sequence of FIGS. 4, 7, 9, and 10.

Additionally or alternatively, an optional visual alert may include reducing the size of the display of the reel or reels that do not lead to, or result in, a payout condition. Such reduction in size of a reel may occur upon the respective reel clearly not leading to a payout condition, such as similar to the timing of the presentation of the lightning bolt and vertical line in FIG. 4, or only when all reels have been stopped, such as represented in the examples of FIGS. 5, 6, 8, 10, 11, 14, 16, and 18.

Figure 20:
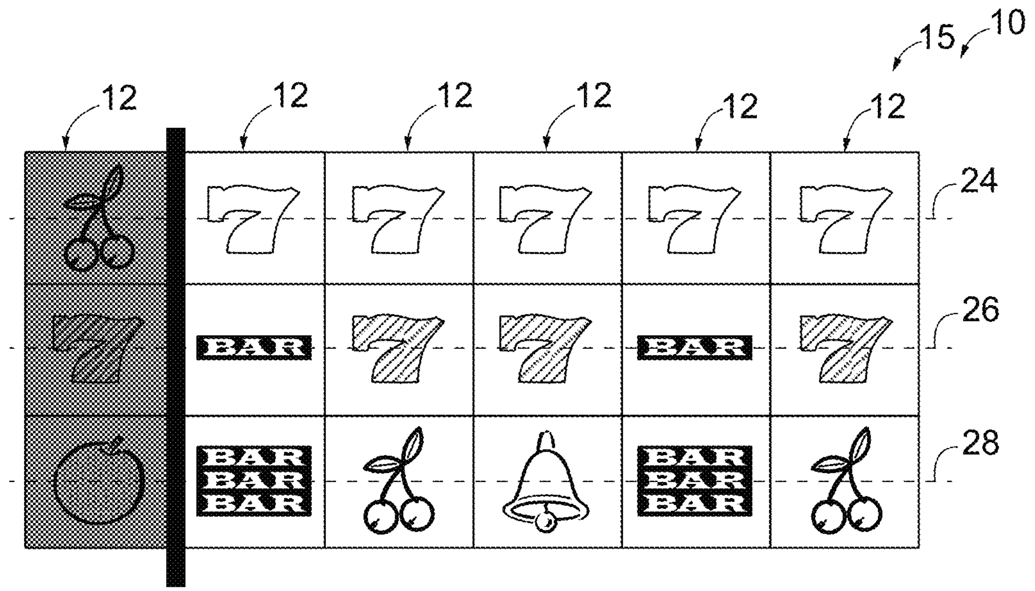
FIG. 20 is a representation of an example reel-based wagering game having six reels with multiple paylines, with all six reels depicted in stopped states, and with the five right-most reels corresponding to a payout condition.

Yet another optional example of a visual alert may include changing the color, changing the shading, changing the contrast, adding cross-hatching, or changing or adding any other visual alert to a stopped reel that does not lead to a payout. FIG. 20 illustrates an example game 10 having six reels 12, shown with all six reels stopped and with the left-most reel shaded to represent that it does not lead to, or result in, a payout.

Additionally or alternatively, in some games 10, the game is configured to alert a player when a stopped reel does lead to, or has the potential to lead to, a payout. Such an alert additionally or alternatively may be described as alerting the player when a subsequently stopped reel does not reset a payline, for example, to maintain the player's excitement as to a possible payout condition. For example, in the sequence of FIGS. 2-4, 7, 9, and 10, when the third reel stops and has the potential to lead to a payout condition due to the second and third reels having a matching symbol along payline 24, an alert (e.g., a visual and/or audible alert) may result, and when the fourth reel stops and has the potential to lead to a payout condition due to the second through fourth reels having the matching symbol along payline 24, an alert (e.g., a visual and/or audible alert) may result.

Figure 5:
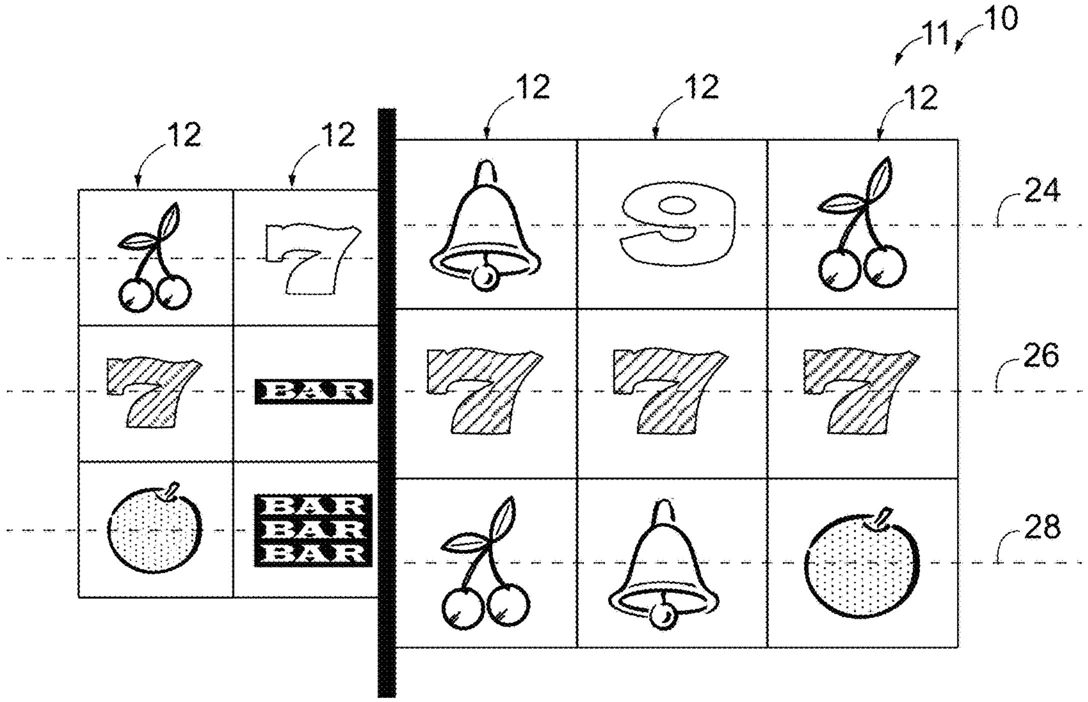
FIG. 5 is a representation of the example game of FIG. 1 in sequence with FIGS. 2-4, with all five reels depicted in stopped states, with the two left-most reels not leading to a payout condition, and with the three right-most reels corresponding to a payout condition.

In some games 10, the game may be configured to sequentially display one or more of the game reels as stopped game reels following having displayed the game reels as changing reels. In some such games, the game is configured to alert a player after each instance of a stopped game reel resulting in a condition that does not lead to a payout and/or in each instance of a stopped game reel resetting the evaluation for a payout. For example, the sequence of FIGS. 2-5 starts with all game reels being displayed as changing game reels (FIG. 2), followed by the left-most game reel being displayed as a stopped game reel (FIG. 3), followed by the two left-most game reels being displayed as stopped game reels (FIG. 4), followed by all five game reels being displayed as stopped game reels (FIG. 5). In this sequence, not only is the player alerted when the first left-most game reel does not lead to a payout condition, but the player also is alerted when the second left-most game reel does not lead to a payout condition (FIG. 5). In this sequence, the three right-most game reels result in a payout condition corresponding to the middle payline 26.

Figure 6:
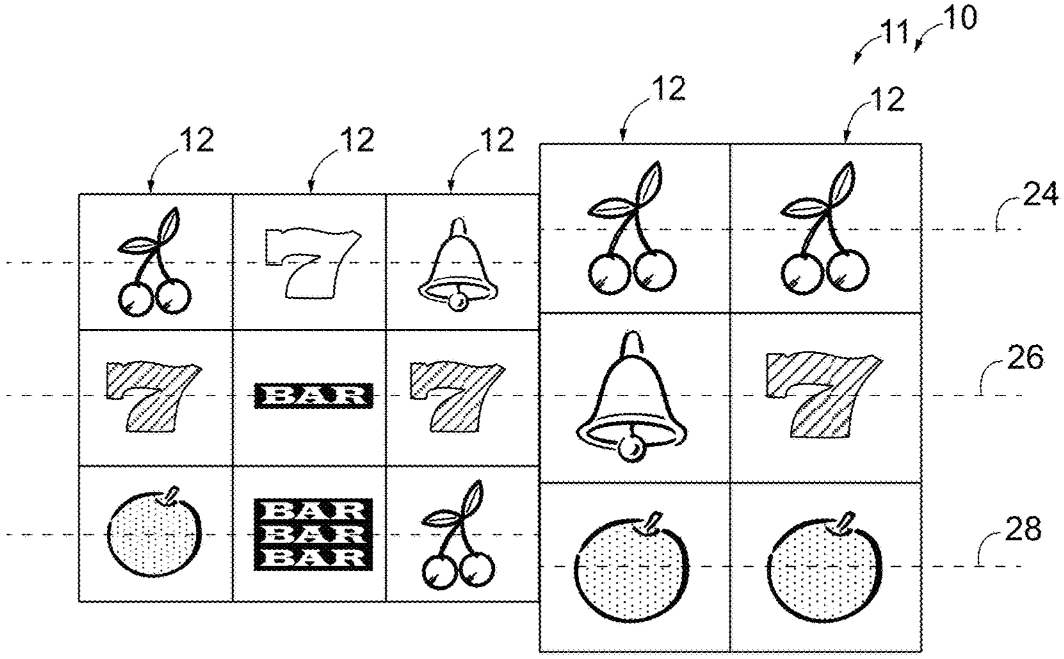
FIG. 6 is a representation of the example game of FIG. 1 in sequence with FIGS. 2-4, with all five reels depicted in stopped states, and with no payout condition being met.
Figure 7:
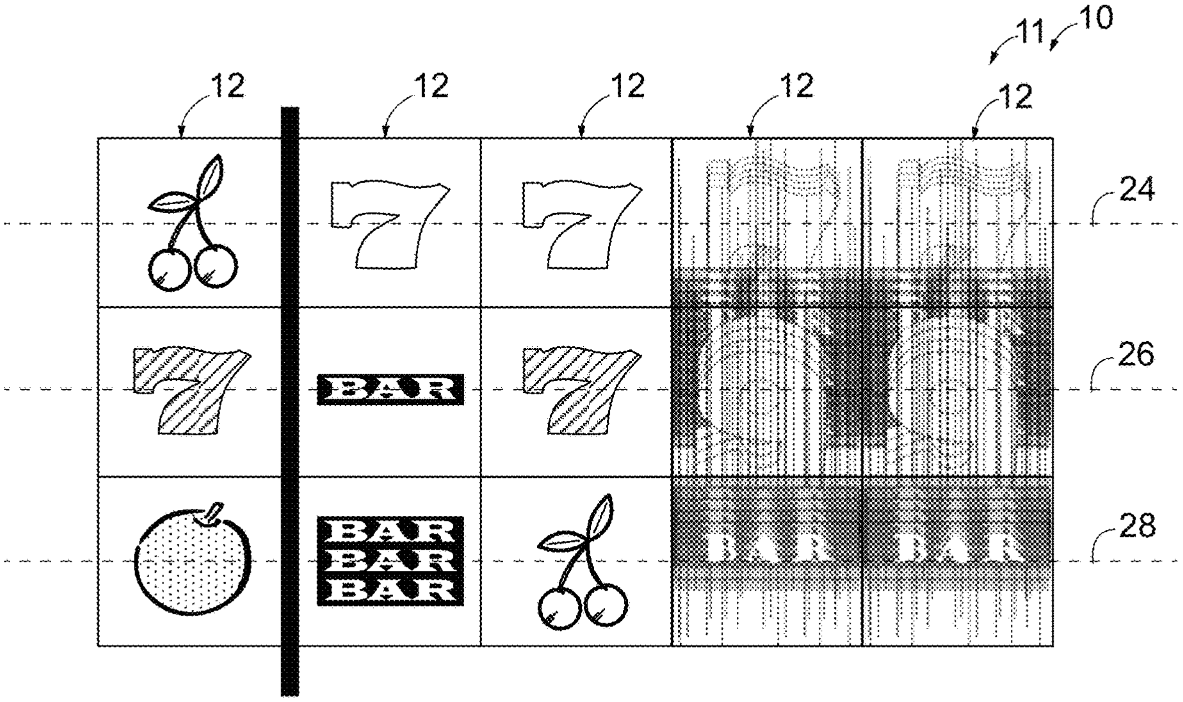
FIG. 7 is a representation of the example game of FIG. 1 in sequence with FIGS. 2-4, with the three left-most reels depicted in stopped states, with the left-most reel not leading to a payout condition, and with the second and third reels from the left leading to a payout condition.
Figure 8:
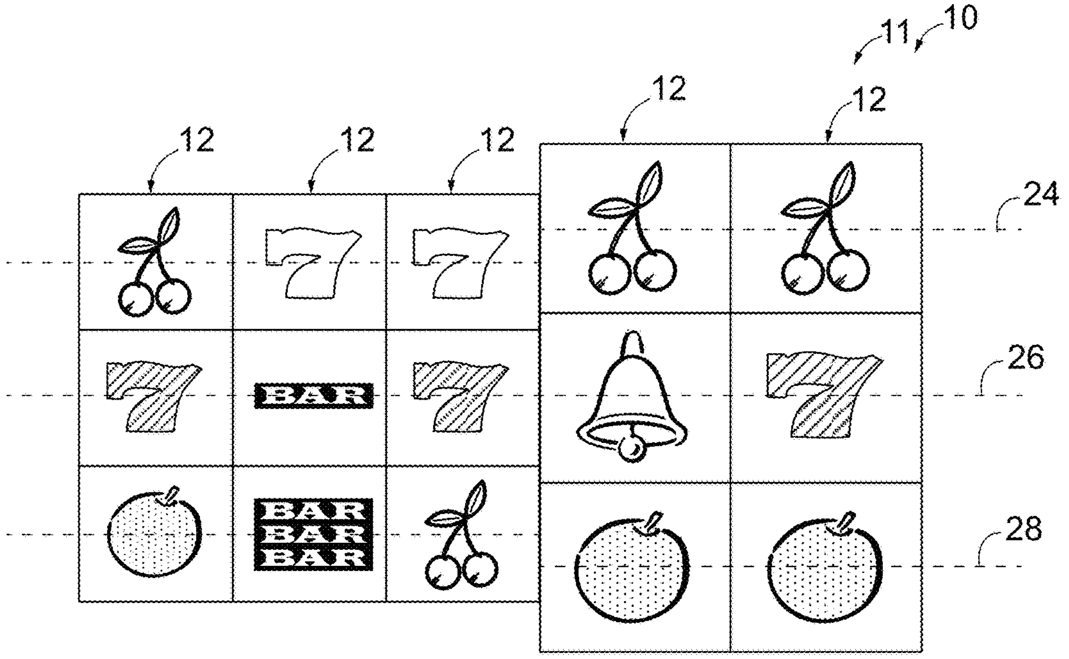
FIG. 8 is a representation of the example game of FIG. 1 in sequence with FIGS. 2-4 and 7, with all five reels depicted in stopped states, and with no payout condition being met.
Figure 9:
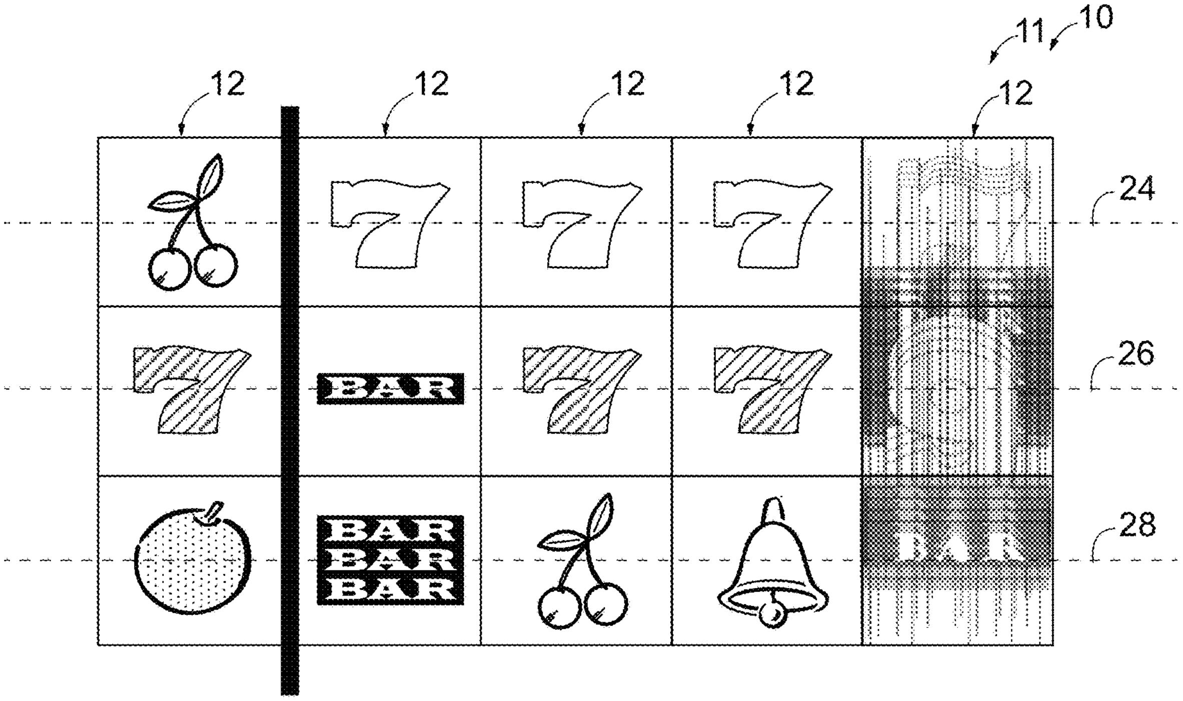
FIG. 9 is a representation of the example game of FIG. 1 in sequence with FIGS. 2-4 and 7, with the four left-most reels depicted in stopped states, and with the second, third, and fourth reels leading to a payout condition.
Figure 10:
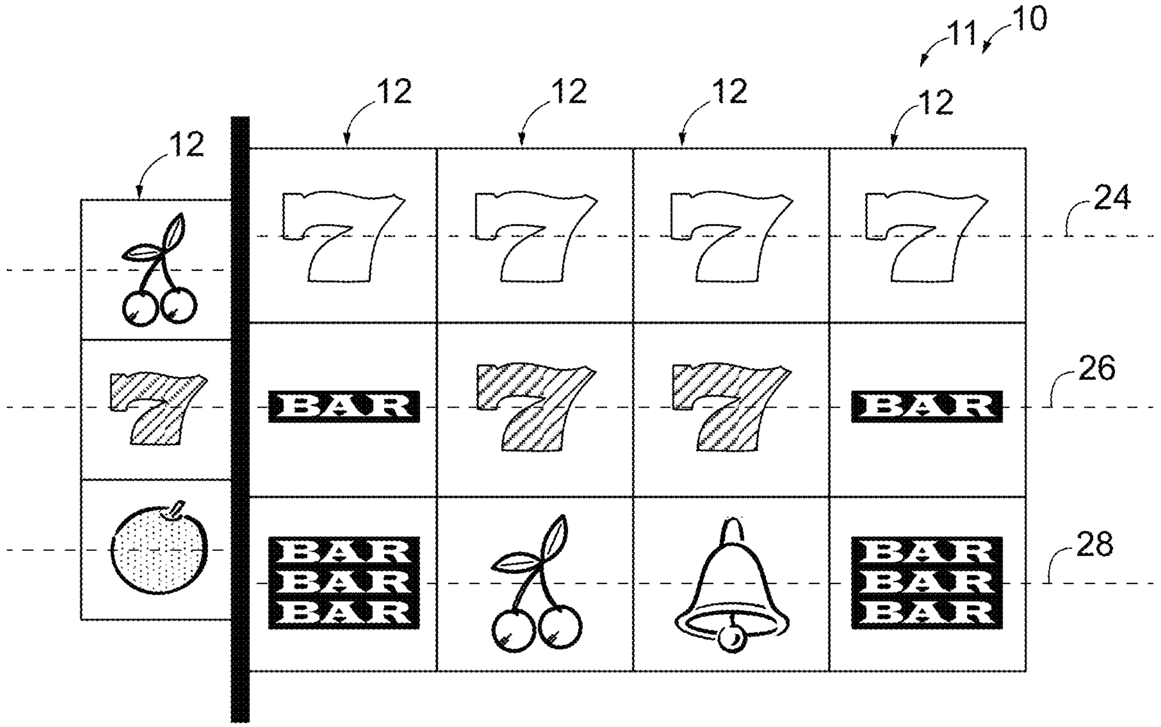
FIG. 10 is a representation of the example game of FIG. 1 in sequence with FIGS. 2-4, 7, and 9, with all five reels depicted in stopped states, and with the four right-most reels corresponding to a payout condition.
Figure 11:
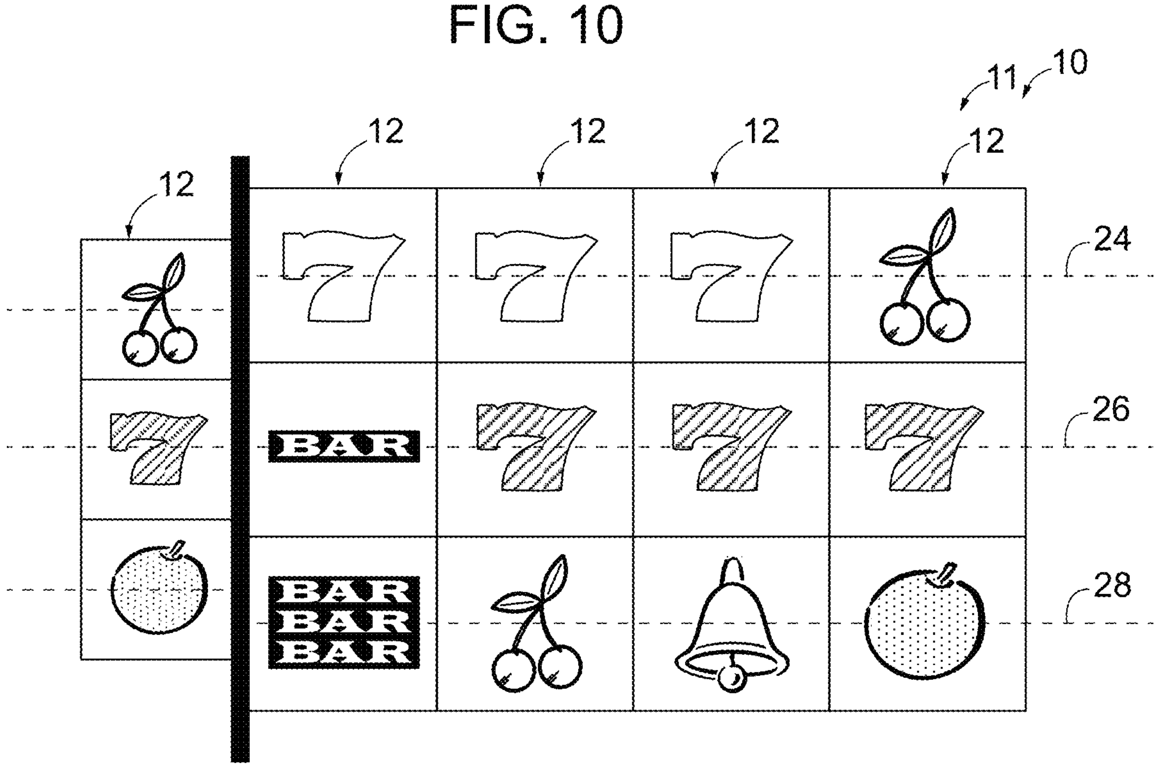
FIG. 11 is a representation of the example game of FIG. 1 in sequence with FIGS. 2-4, 7, and 9, with all five reels depicted in stopped states, and with both the three middle reels and the three right-most reels corresponding to a payout condition.
Figure 12:
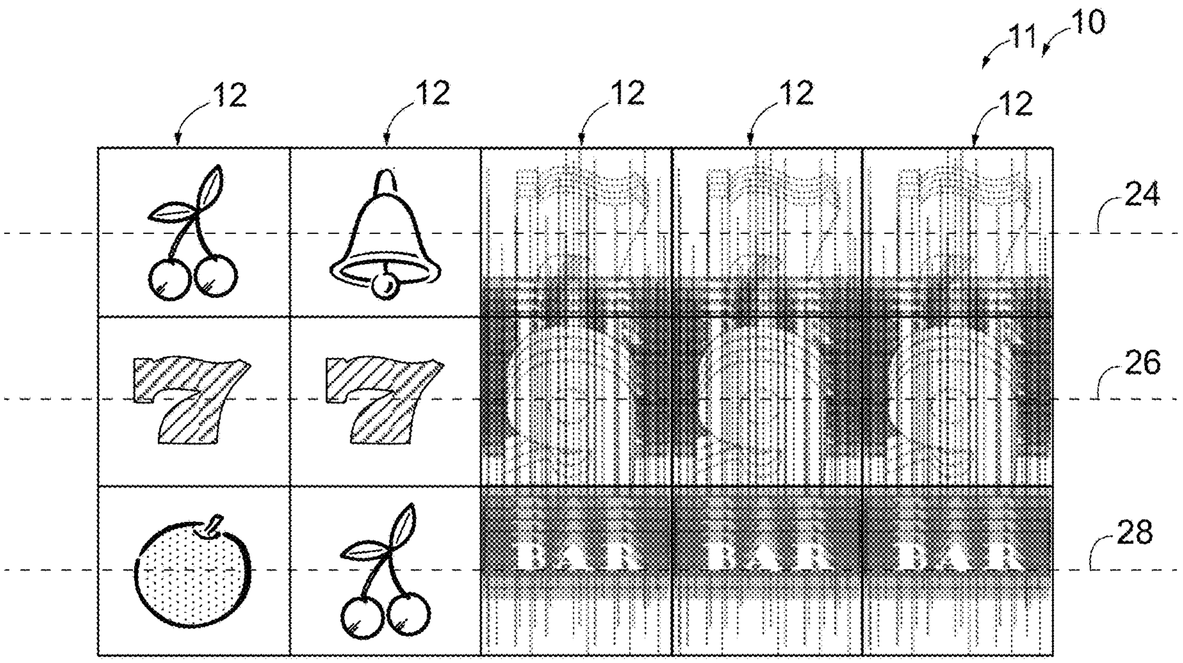
FIG. 12 is a representation of the example game of FIG. 1 in sequence with FIGS. 2-3, with the two left-most reels depicted in stopped states and leading to a payout condition.
Figure 13:
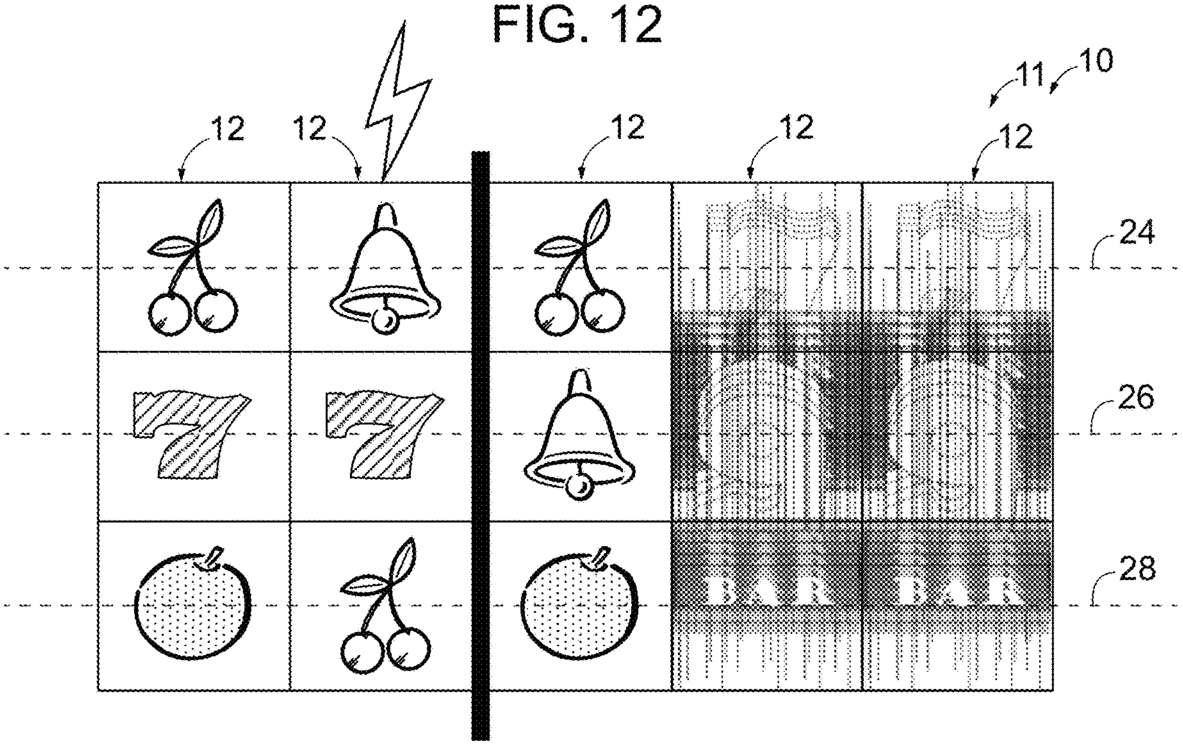
FIG. 13 is a representation of the example game of FIG. 1 in sequence with FIGS. 2-3 and 12, with the three left-most reels depicted in stopped states, and with the two left-most reels not leading to a payout condition.
Figure 14:
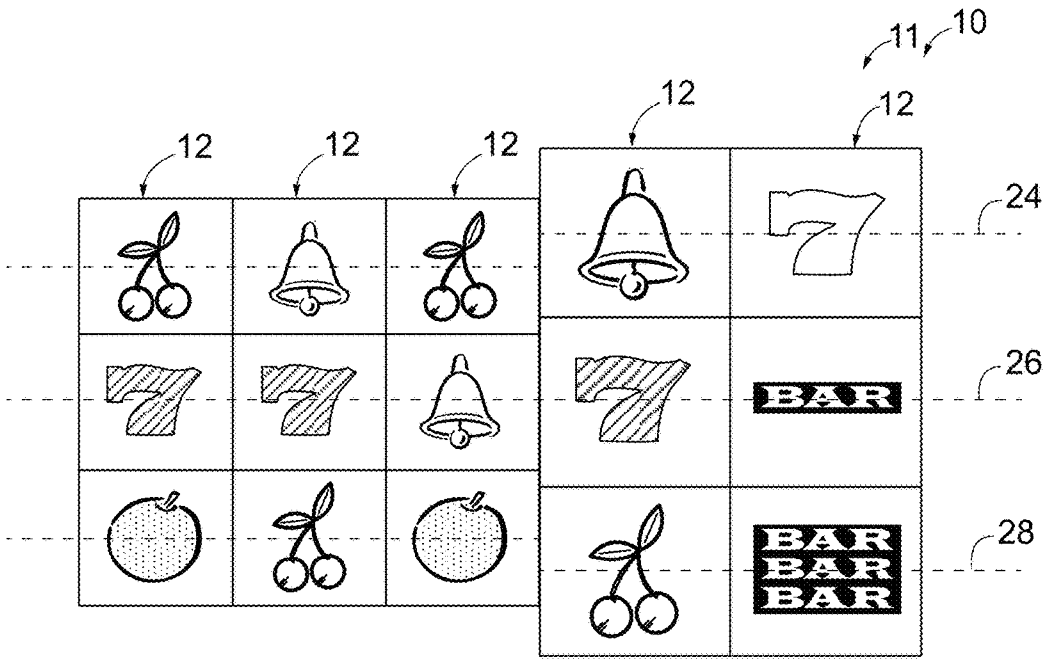
FIG. 14 is a representation of the example game of FIG. 1 in sequence with FIGS. 2-3 and 12-13, with all five reels depicted in stopped states, and with no payout condition being met.
Figure 15:
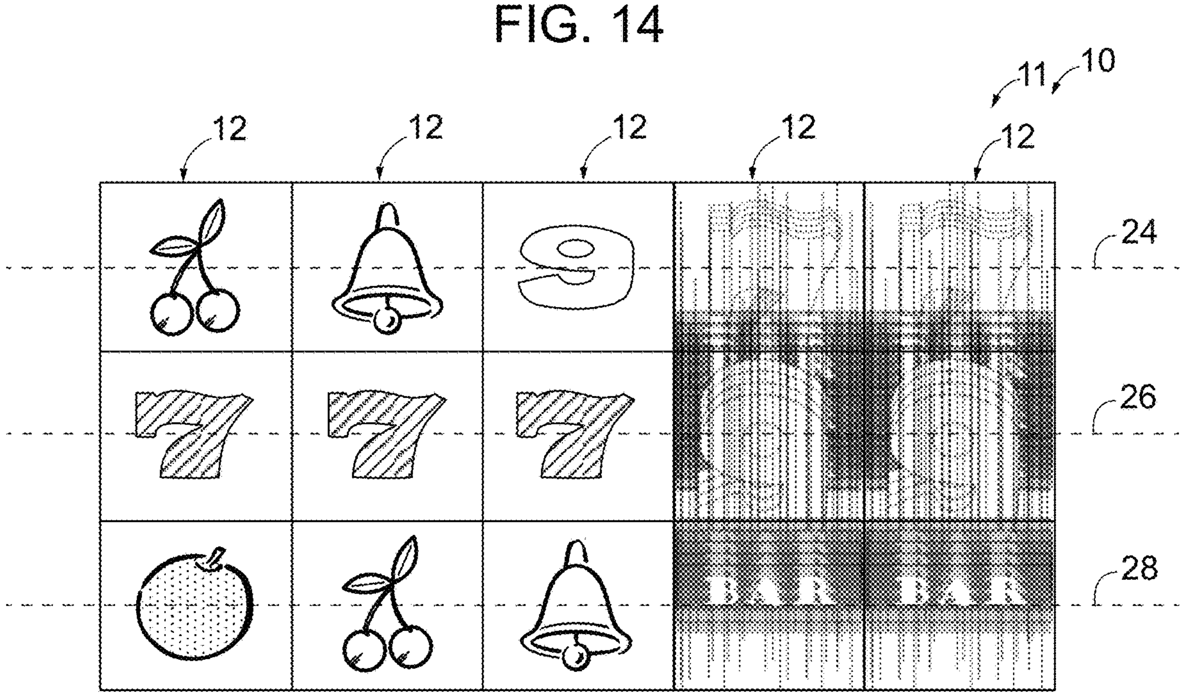
FIG. 15 is a representation of the example game of FIG. 1 in sequence with FIGS. 2-3 and 12, with the three left-most reels depicted in stopped states and leading to a payout condition.
Figure 16:
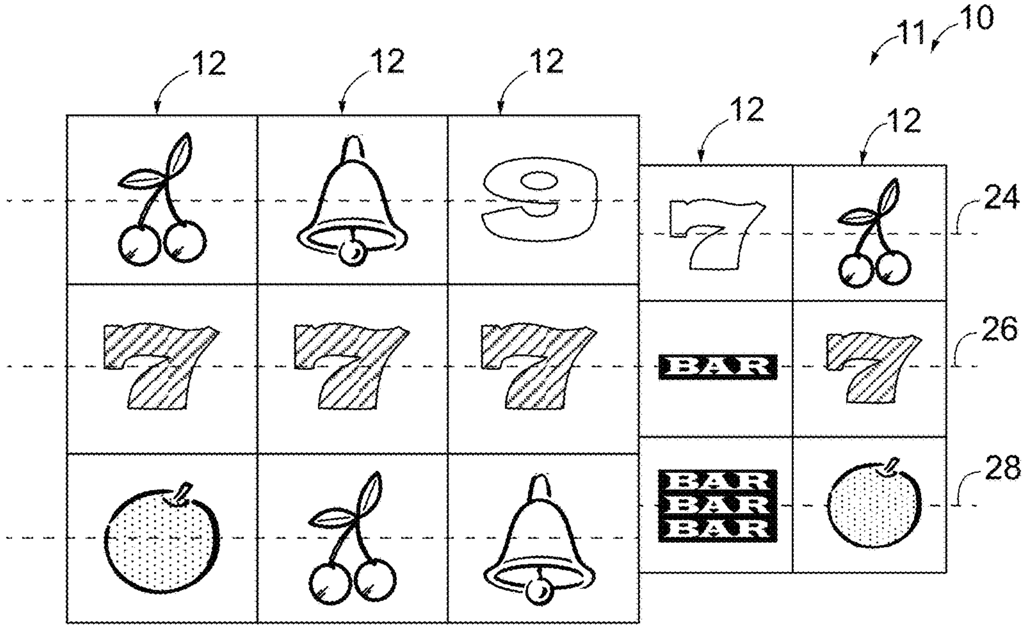
FIG. 16 is a representation of the example game of FIG. 1 in sequence with FIGS. 2-3, 12, and 15, with all five reels depicted in stopped states, and with the three left-most reels corresponding to a payout condition.
Figure 17:
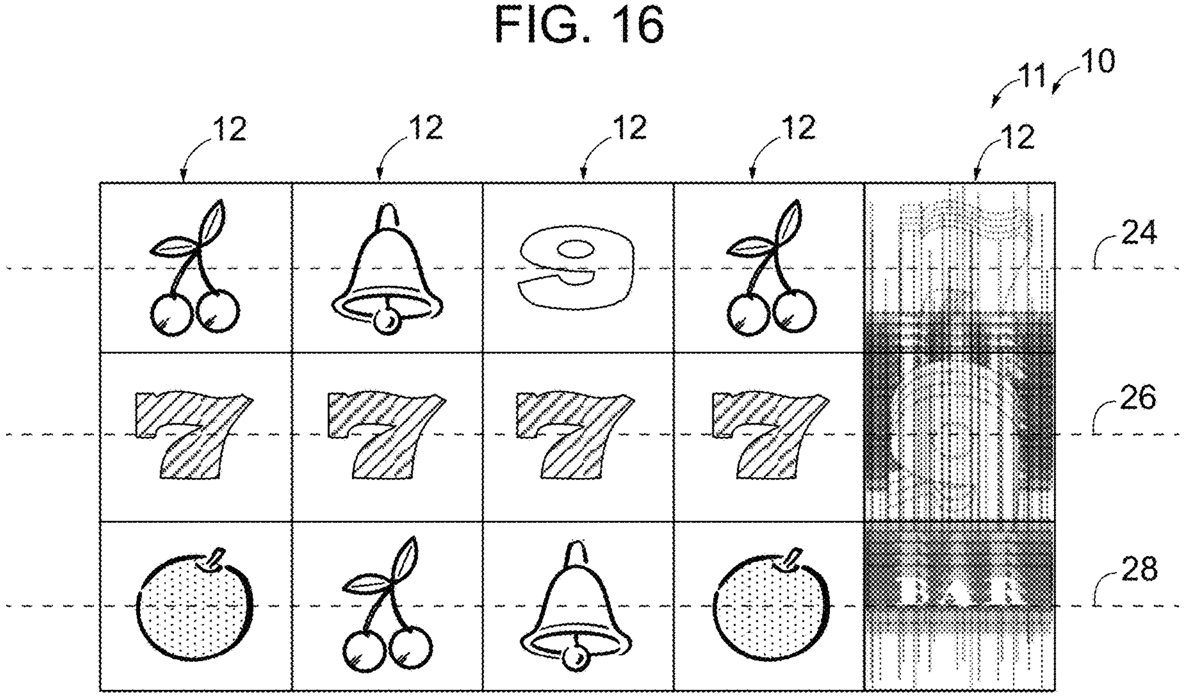
FIG. 17 is a representation of the example game of FIG. 1 in sequence with FIGS. 2-3, 12, and 15, with the four left-most reels depicted in stopped states and leading to a payout condition.
Figure 18:
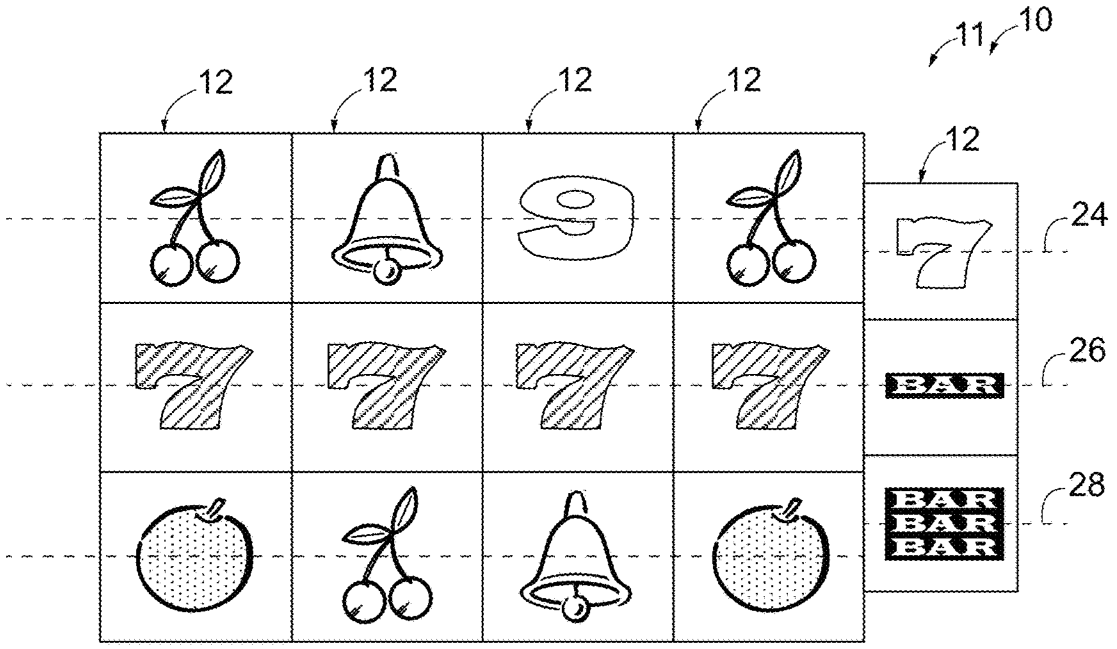
FIG. 18 is a representation of the example game of FIG. 1 in sequence with FIGS. 2-3, 12, 15, and 17, with all five reels depicted in stopped states, and with the four left-most reels corresponding to a payout condition.
Figure 19:
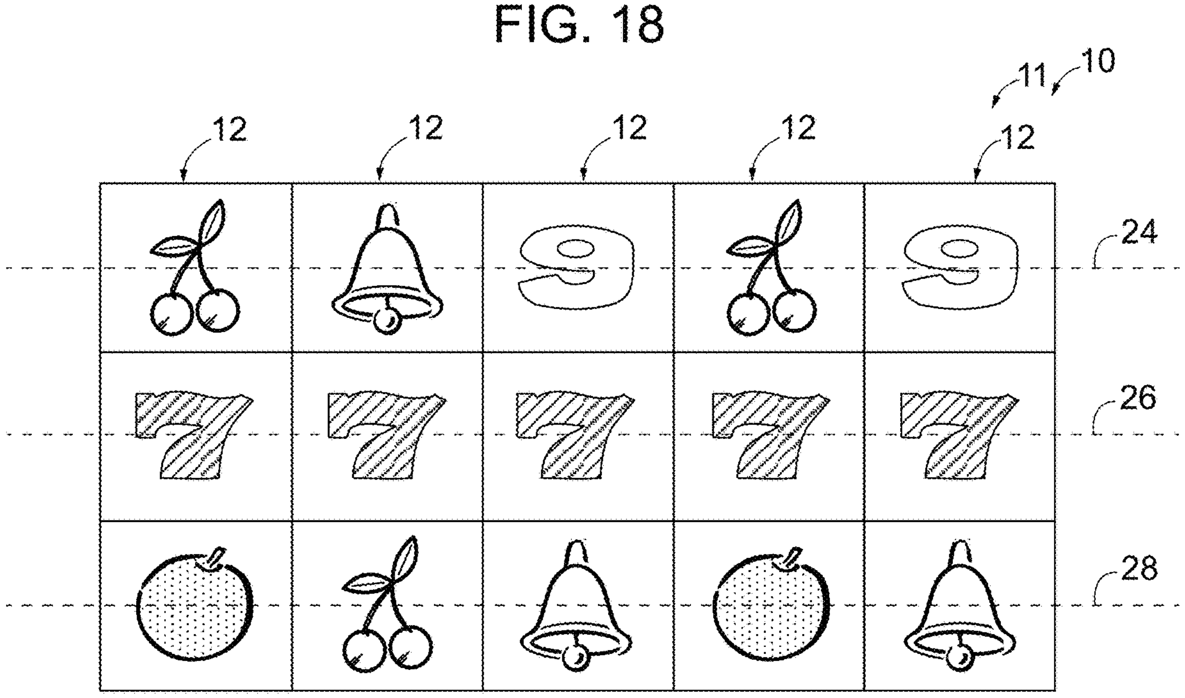
FIG. 19 is a representation of the example game of FIG. 1 in sequence with FIGS. 2-3, 12, 15, and 17, with all five reels depicted in stopped states and corresponding to a payout condition.

On the other hand, the sequence of FIGS. 2-4 and 6 starts with all game reels being displayed as changing game reels (FIG. 2), followed by the left-most game reel being displayed as a stopped game reel (FIG. 3), followed by the two left-most game reels being displayed as stopped game reels (FIG. 4), followed by the third left-most, or center, game reel not leading to a payout condition (FIG. 6). Moreover, in the example of games 11, in which a minimum of three identical symbols must be aligned in sequence along a payline 22 to result in a win, if the center game reel does not lead to a payout condition, such as in FIG. 6, then no payout condition will be met at all for that discrete game play.

FIGS. 7-19 illustrate further examples of games 11 being played, including scenarios where a payout condition is met and scenarios where a payout condition is not met. For example, the sequence of FIGS. 2-4, and 7-8 results in no payout, the sequence of FIGS. 2-4, 7, and 9-10 results in a payout condition associated with payline 24, the sequence of FIGS. 2-4, 7, 9, and 11 results in a payout condition associated with payline 24 and with payline 26, the sequence of FIGS. 2-3, and 12-14 results in no payout, the sequence of FIGS. 2-3, 12, and 15-16 results in a payout condition associated with payline 26, the sequence of FIGS. 2-3, 12, 15, and 17-18 results in a payout condition associated with payline 26, and the sequence of FIGS. 2-3, 12, 15, 17, and 19 results in a payout condition associated with payline 26.

The examples of games 11 illustrated in FIGS. 1-19 correspond to changing reels sequentially becoming stopped reels from left to right, as may be typical of slot machines. However, games 10 are not limited to such implementations. For example, a game 10 may be configured to display stopped reels other than sequentially from left to right and other than stopping a single reel at a time. For example, changing reels may be sequentially stopped, starting with the outer-most reels and moving inward toward the center. Other examples, including ordered sequences, as well as random sequences, for stopping reels may be used with games 10.

Figure 21:
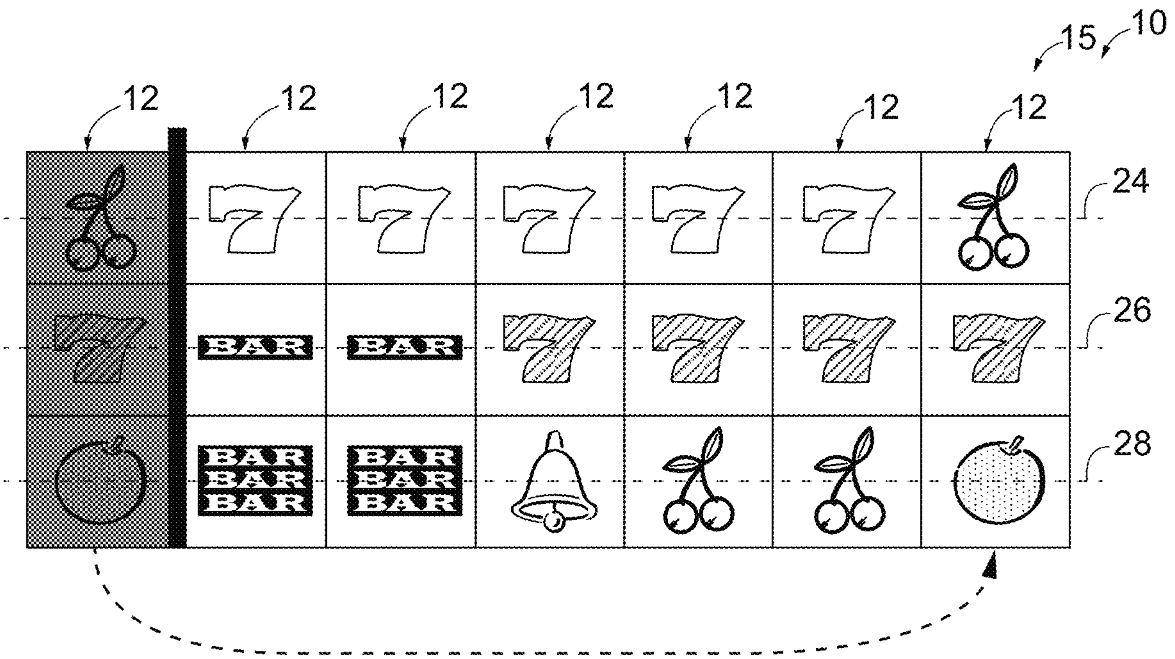
FIG. 21 is a representation of an example reel-based wagering game having six reels with multiple paylines, showing the left-most reel moved to become the right-most reel and resulting in a payout condition with the three preceding reels.

FIGS. 20 and 21 illustrate an example game 10, referred to herein as game 15. Game 15 has a grid 16 representing three rows 18 of symbols 14 from six reels 12, resulting in a total of eighteen displayed symbols 14 when all six reels 12 are stopped. In some games 10, such as depicted in FIG. 21 in connection with game 15, a stopped reel that does not lead to a payout under a normal left-to-right sequence of reels along a payline 22 may be moved to a right-most position of the reels 12 to be reevaluated for a payout condition with the preceding reels. Additionally or alternatively, the moved reel may be respun, either automatically by the game or responsive to a player input to respin the moved reel. Other examples of reusing stopped reels also may be incorporated into games 10.

Also within the scope of the present disclosure are methods associated with reel-based wagering games 10. The following description provides an illustrative, non-exclusive example of such a method. However, as understood also with reference to the discussion of games 10 above, not all methods according to the present disclosure are required to include the expressly identified steps, and other methods and steps are within the scope of the present disclosure, including methods having greater than or fewer than the number of steps expressly identified below, as understood from the discussions herein.

For example, a reel-based wagering game method according to the present disclosure may comprise (1) displaying changing reels, wherein the changing reels comprise at least a first reel, a second reel, and one or more additional reels; (2) stopping the changing reels to display stopped reels, where the stopped reels comprise at least a stopped first reel, a stopped second reel, and one or more additional stopped reels, and wherein each stopped reel comprises displayed game symbols; (3) determining if the displayed game symbols of the stopped first reel and the displayed game symbols of the stopped second reel correspond to a first predetermined arrangement of game symbols that lead to a payout condition; (4) responsive to the displayed game symbols of the stopped first reel and the displayed game symbols of the stopped second reel not corresponding to the first predetermined arrangement of game symbols: (4a) altering the payout condition to a first altered payout condition; (4b) determining if the displayed game symbols of the stopped second reel and the displayed game symbols of the one or more additional stopped reels correspond to a second predetermined arrangement of game symbols that lead to the first altered payout condition; (4c) responsive to the displayed game symbols of the stopped second reel and the displayed game symbols of the one or more additional stopped reels not corresponding to the second predetermined arrangement of game symbols, altering the payout condition to a second altered payout condition; and (4d) responsive to the displayed game symbols of the stopped second reel and the displayed game symbols of the one or more additional stopped reels corresponding to the second predetermined arrangement of game symbols, not altering the payout condition; (5) responsive to the displayed game symbols of the first stopped reel and the displayed game symbols of the second stopped reel corresponding to the first predetermined arrangement of game symbols: (5a) not altering the payout condition; (5b) determining if the displayed game symbols of the stopped first reel, the displayed game symbols of the stopped second reel, and the game symbols of the one or more additional stopped reels correspond to the first predetermined arrangement of game symbols; (5c) responsive to the displayed game symbols of the stopped first reel, the displayed game symbols of the stopped second reel, and the game symbols of the one or more additional stopped reels not corresponding to the first predetermined arrangement of game symbols: (5c1) altering the payout condition to a third altered payout condition; (5c2) determining if the displayed game symbols of the stopped second reel and the displayed game symbols of the one or more additional stopped reels correspond to a third predetermined arrangement of game symbols that lead to the third altered payout condition; (5c3) responsive to the displayed game symbols of the stopped second reel and the displayed game symbols of the one or more additional stopped reels not corresponding to the third predetermined arrangement of game symbols, altering the payout condition to a fourth altered payout condition or ending the game with no payout; and (5c4) responsive to the displayed game symbols of the stopped second reel and the displayed game symbols of the one or more additional stopped reels corresponding to the third predetermined arrangement of game symbols, not altering the payout condition; and (5d) responsive to the displayed game symbols of the stopped first reel, the displayed game symbols of the stopped second reel, and the game symbols of the one or more additional stopped reels corresponding to the first predetermined arrangement of game symbols, not altering the payout condition.

Additionally or alternatively, a reel-based wagering game method according to the present disclosure may be described as (1) displaying game reels as spinning game reels or changing game reels; (2) displaying a first set of the game reels as stopped reels; (3) evaluating whether the first set of the game reels corresponds to a first payout condition; (4) responsive to the first set of the game reels not corresponding to the first payout condition: (4a) alerting a player of a first subsequent opportunity for payout based on then spinning game reels or then changing game reels; (4b) displaying a second set of the game reels as stopped reels; and (4c) evaluating whether the second set of the game reels corresponds to a second payout condition; (5) responsive to the first set of the game reels corresponding to the first payout condition: (5a) displaying one or more additional game reels as stopped reels; (5b) evaluating whether the first set of the game reels and the one or more additional game reels correspond to the first payout condition; (5c) responsive to the first set of the game reels and the one or more additional game reels not corresponding to the first payout condition, alerting the player of a second subsequent opportunity for payout based on then spinning game reels or then changing game reels; and (5d) responsive to the first set of the game reels and the one or more additional game reels corresponding to the first payout condition, displaying one or more yet additional game reels as stopped reels. In some such examples, the first set of game reels and the second set of game reels share at least one common reel. For example, with reference to the sequence of FIGS. 2-4 and 7, the two left-most reels comprise the first set of game reels and the second and third left-most reels comprise at least a portion of the second set of game reels, with the second left-most reel included in both the first set and the second set of game reels.

Figure 22:
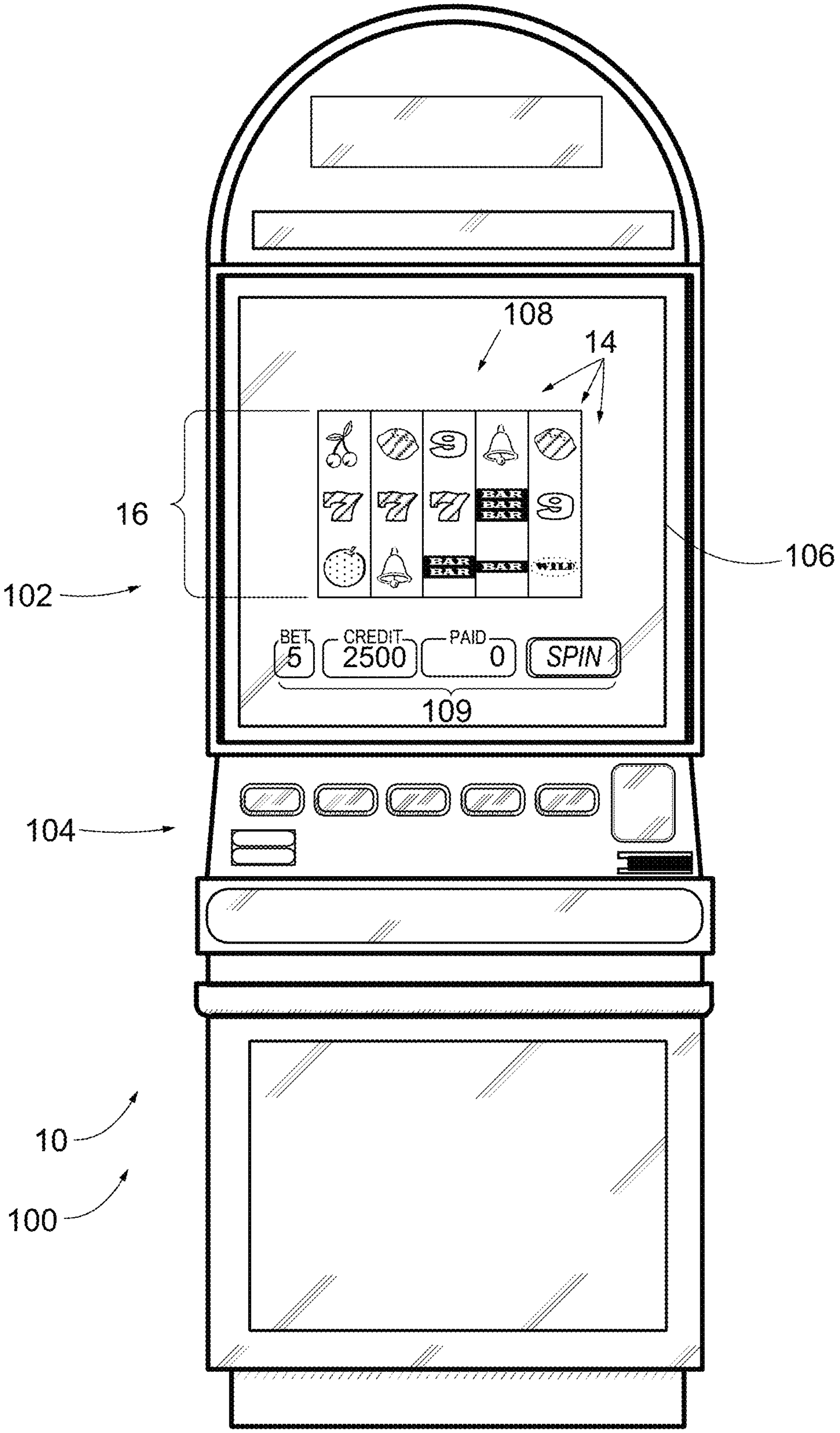
FIG. 22 is a front view of an example gaming apparatus.

Turning now to FIG. 22, an example gaming apparatus 100 that may embody a game 10 and implement a method according to the present disclosure is depicted. The gaming apparatus includes a display area 102 (also referred to as a gaming display), and a player interface area 104 (also referred to as a user interface), although some or all of the interactive mechanisms included in the player interface area 104 may be provided via graphical icons used with a touch screen in the display area 102 in some embodiments. The display area 102 may include one or more game displays 106 (also referred to as "displays" or "gaming displays") that may be included in physically separate displays or as portions of a common large display. Here, the game display 106 includes a primary game play portion 108 that displays game elements and symbols 14 such as associated with games 10, and an operations portion 109 that can include meters, various game buttons, or other game information for a player of the gaming apparatus 100.

The user interface 104 allows the user to control and engage in play of the gaming apparatus 100 and thus of games 10. The particular user interface mechanisms included with user interface 104 may be dependent on the type of gaming device. For example, the user interface 104 may include one or more buttons, switches, joysticks, levers, pull-down handles, trackballs, voice-activated input, touch screens (including, e.g., the game display 102), or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 23. For example, currency input mechanisms, card readers, credit card readers, smart card readers, punch card readers, radio frequency identifier (RFID) readers, and other mechanisms may be used to enter wagers. The user interface 104 also may include a mechanism to read and/or validate player loyalty information to identify a user or player of the gaming device. This mechanism may be a card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with games 10 and gaming apparatus 100, including pressing buttons, touching a segment of a touch-screen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In connection with games 10, the primary gaming portion 108 may display grid 16 (or an equivalent arrangement) of game symbols 14.

The primary gaming portion 108 may include other features known in the art that facilitate gaming, such as operations portion 109. As is generally known in the art, the operations portion 109 provides information about current bets, current wins, remaining credits, etc. associated with gaming activities of the grid 16 of game symbols 14. The operations portion 109 also may provide touchscreen controls for facilitating game play. The grid 16 also may include touchscreen features, such as facilitating selection of individual symbols, or user controls over stopping or spinning/changing reels. The game display 106 of the display area 102 may include other features that are not shown, such as paytables, navigation controls, etc.

Figure 23:
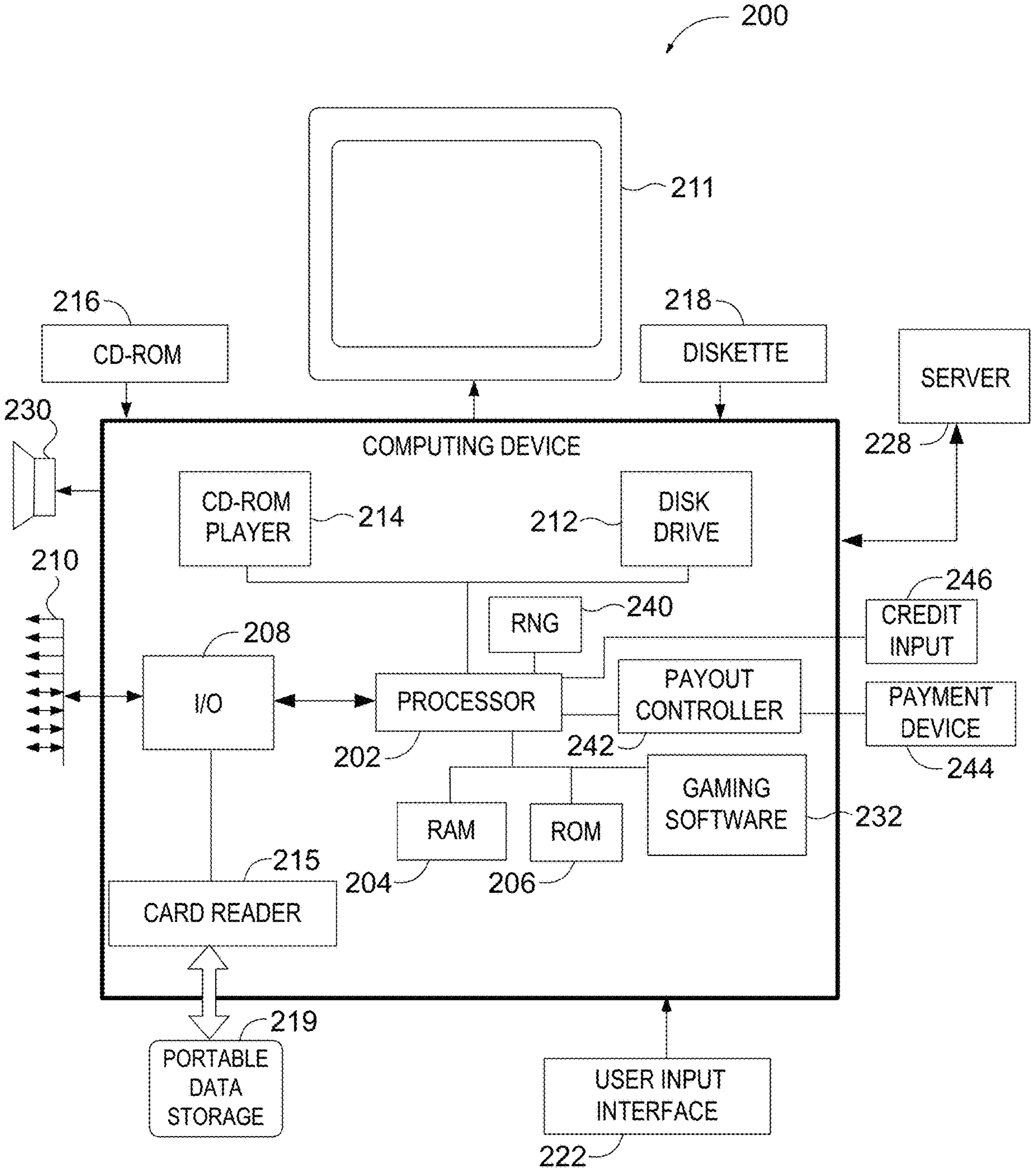
FIG. 23 is a block diagram representing an example computer arrangement.

Although FIG. 22 illustrates a particular implementation of a gaming apparatus 100 that embodies a game 10 in the form of a casino or electronic gaming machine ("EGM"), one or more devices may be programmed to play various embodiments of games 10. That is, games 10 may be implemented, as shown in FIG. 22, as a casino gaming machine or other special purpose gaming kiosk as described herein, or may be implemented via computing systems operating under the direction of local gaming software, and/or remotely-provided software such as provided by an application service provider (ASP). Casino gaming machines also may utilize computing systems to control and manage the gaming activity, although these computing systems typically include specialized components and/or functionality to operate the particular elements of casino gaming machines. Additionally, computing systems operating over networks, such as the Internet, also may include specialized components and/or functionality to operate elements particular to these systems, such as random number generators. An example of a representative computing system capable of carrying out operations in accordance with games 10 is illustrated in FIG. 23.

Hardware, firmware, software or a combination thereof may be used to perform the various gaming functions, display presentations and operations described herein. The functional modules used in connection with games 10 may reside in a gaming machine as described, or may alternatively reside on a stand-alone or networked computer. The computing structure 200 of FIG. 23 (also referred to as computing arrangement and computing device) is an example computing structure that may be used in connection with such electronic gaming machines, computers, or other computer-implemented devices to carry out operations of games 10. Although numerous components or elements are shown as part of this computing structure 200 in FIG. 23, additional or fewer components may be utilized in particular implementations of games 10.

The example computing arrangement 200 suitable for performing the gaming functions in accordance with games 10 typically includes a central processor (CPU) 202 coupled to random access memory (RAM) 204 and some variation of read-only memory (ROM) 206. Processor 202, either alone or together with one or more additional components of a computing arrangement, may be described as a controller. The ROM 206 also may represent other types of storage media to store programs, such as programmable ROM (PROM), erasable PROM (EPROM), etc. The processor 202 may communicate with other internal and external components through input/output (I/O) circuitry 208 and bussing 210, to provide control signals, communication signals, and the like.

The computing arrangement 200 also may include one or more data storage devices, including hard and floppy disk drives 212, CD-ROM drives 214, a card reader 215, and other hardware capable of reading and/or storing information such as DVDs, etc. In one embodiment, software for carrying out the operations in accordance with games 10 may be stored and distributed on a CD-ROM 216, diskette 218, or portable data storage 219, such as in the form of an access card or other form of computer readable media capable of portably storing information. These storage media may be inserted into, and read by, devices such as the CD-ROM drive 214, the disk drive 212, card reader 215, etc. The software also may be transmitted to the computing arrangement 200 via data signals, such as being downloaded electronically via a network, such as a local area network (e.g., a casino, property, or bank network) or a wide area network (e.g., the Internet). Further, as previously described, the software for carrying out the functions associated with games 10 alternatively may be stored in internal memory/storage of the computing device 200, such as in the ROM 206.

The computing arrangement 200 is coupled to the display 211, which represents a display on which the gaming activities in accordance with games 10 are presented. The display 211 represents the "presentation" of the game information in accordance with games 10, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, such as a gaming apparatus 100, the display 211 corresponds to the game display 106 of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, or inputting data to identify a player for a player loyalty system. The display 211 also may act as a user input device, e.g., where the display 211 is a touchscreen device. In some embodiments, where the computing device 200 is implemented in a personal computer, tablet, smart phone, or other consumer electronic device, the user interface and display may be the available input/output mechanisms related to those devices.

Chance-based gaming systems such as slot machines, in which games 10 are applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 202, or some combination of hardware and software. Games 10 are operable using any known RNG, and may be integrally programmed as part of the processor 202 operation, or alternatively may be a separate RNG controller 240. The RNGs often are protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with games 10 may interact with the player via one or more networks. The computing arrangement 200 also may be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 also may include a payout controller 242 configured to receive a signal from the processor 202 indicating a payout is to be made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 also may be provided in gaming machine embodiments, where the payout device 244 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency. In yet other embodiments, the payout device 244 may send a signal via the network server 228 or other device to electronically provide a credit amount to an account associated with the player, such as a credit card account or player loyalty account. The computing arrangement 200 also may include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 (also referred to as credit input 246) represents any mechanism for accepting coins, tokens, coupons, bills, electronic fund transfer (EFT), tickets, credit cards, smart cards, membership/loyalty cards, etc., for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payout device 244 and payout controller 242 for independently determined payout events.

Among other functions, the computing arrangement 200 provides an interactive experience to players via an input interface 222 and output devices, such as the display 211, speaker 230, etc. These experiences generally are controlled by gaming software 232 that controls a primary gaming activity of the computing arrangement 200. The gaming software 232 may be temporarily loaded into RAM 204, and may be stored locally using any combination of ROM 206, drives 212, CD ROM drives 214, flash memory, or other non-transitory computer-readable storage media known in the art. The primary gaming software 232 also may be accessed remotely, such as via the server 228 or the Internet.

The primary gaming software 232 in the computing arrangement 200 may be an application software module. According to embodiments of games 10, this software 232 provides a slot game or similar game of chance as described hereinabove. For example, the software 232 may present, by way of the display 211, representations of symbols to map or otherwise display as part of a slot-based game having reels, such as games 10. However, in other embodiments, the principles of this concept may be applied to poker games or other types of games of chance. Symbols appearing in one or more predefined combinations of symbol positions may be evaluated to determine awards based on a paytable. The software 232 may include instructions to provide other functionality as known in the art or as described and shown herein.

Illustrative, non-exclusive examples of inventive subject matter according to the present disclosure are described in the following enumerated paragraphs:

A. A reel-based wagering game, comprising:

X game reels, wherein X is an integer greater than or equal to 3; and multiple paylines, each payline having at least a first payout condition and a second payout condition, wherein the first payout condition corresponds to a first predetermined arrangement of game symbols along a respective payline, wherein the second payout condition corresponds to a second predetermined arrangement of game symbols along the respective payline, and wherein the second predetermined arrangement of game symbols differs from the first predetermined arrangement of game symbols.

A1. The reel-based wagering game of paragraph A, wherein the first predetermined arrangement of game symbols is associated with all X game reels; and wherein the second predetermined arrangement of game symbols is associated with a first subset of the X game reels.

A1.1. The reel-based wagering game of paragraph A1, wherein the first subset consists of X-1 game reels.

A1.2. The reel-based wagering game of paragraph A1, wherein the first subset consists of X-2 game reels.

A2. The reel-based wagering game of any of paragraphs A-A1.2, wherein the second payout condition triggers a payout scheme that is less rewarding than the first payout condition.

A3. The reel-based wagering game of any of paragraphs A-A2, wherein each payline has a third payout condition corresponding to a third predetermined arrangement of game symbols along the respective payline.

A3.1. The reel-based wagering game of paragraph A3 when depending from paragraph A1, wherein the third predetermined arrangement of game symbols is associated with a second subset of the X game reels, and wherein the second subset consists of X-2 game reels.

A3.2. The reel-based wagering game of paragraph A3 when depending from paragraph A1, wherein the third predetermined arrangement of game symbols is associated with a second subset of the X game reels, and wherein the second subset consists of X-4 game reels.

A3.3. The reel-based wagering game of any of paragraphs A3-A3.2, wherein the third payout condition triggers a payout scheme that is less rewarding than the second payout condition.

A4. The reel-based wagering game of any of paragraphs A-A3.3, wherein X is in the range of 3-10, is 3, is 4, is 5, is 6, is 7, is 8, is 9, is 10, or is greater than 10.

A5. The reel-based wagering game of any of paragraphs A-A4, wherein the game is configured to alert a player when a reel of the X game reels does not lead to a payout and/or when the player is provided with a subsequent opportunity for a payout.

A5.1. The reel-based wagering game of paragraph A5, wherein alert comprises one or both of visually alert and audibly alert.

A6. The reel-based wagering game of any of paragraphs A-A5.1, wherein the game is configured to:

first, display the game reels as spinning or changing game reels; and second, display the game reels as stopped game reels.

A6.1. The reel-based wagering game of paragraph A6, wherein display the game reels as stopped game reels comprises sequentially display one or more of the game reels as stopped game reels.

A6.1.1. The reel-based wagering game of paragraph A6.1, wherein the game is configured to alert a player after each instance of a stopped game reel not leading to a payout and/or when the player is provided with subsequent opportunities for payouts.

A7. A gaming apparatus configured to implement the reel-based wagering game of any of paragraphs A-A6.1.1, the gaming apparatus comprising:

a game display configured to display at least the game reels;

a user interface configured to receive user input for controlling and engaging with the reel-based wagering game;

a wager input device structured to receive physical currency or currency based structure, the currency or currency based structure establishing a credit balance, the credit balance being increasable and decreasable based at least on wagering activity received from a user via the user interface; and a controller operably coupled to the game display, the user interface, and the wager input device, wherein the controller is configured to:

- responsive at least to initiation of a play, cause the game display to display the game reels as spinning game reels or changing game reels, and to subsequently display the game reels as stopped game reels; and
- evaluate whether the stopped game reels correspond to a payout associated with the multiple paylines.

A7.1. The gaming apparatus of paragraph A7, wherein the subsequently display the game reels as stopped game reels comprises subsequently and sequentially display one or more of the game reels as stopped game reels; and wherein the controller is further configured to:

- evaluate whether each sequentially one or more stopped game reels correspond to a payout associated with the multiple paylines.

A7.2. The gaming apparatus of any of paragraphs A7-A7.1, wherein the controller is further configured to:

- responsive to a stopped reel not leading to a payout, alert the user that a change in a payout scheme has occurred and/or that the player is provided with a subsequent opportunity for a payout.

A7.2.1. The gaming apparatus of paragraph A7.2, wherein the controller is further configured to:

- cause the game display to display a visual alert that is representative of the change in the payout scheme and/or the subsequent opportunity.

A7.2.1.1. The gaming apparatus of paragraph A7.2.1, wherein the visual alert comprises a symbol.

A7.2.1.2. The gaming apparatus of any of paragraphs A7.2.1-A7.2.1.1, wherein the visual alert comprises a change in size of a stopped game reel not leading to a payout.

A7.2.1.3. The gaming apparatus of any of paragraphs A7.2.1-A7.2.1.2, wherein the visual alert comprises a visual separation between a stopped game reel not leading to a payout and an adjacent game reel.

A7.2.1.4. The gaming apparatus of any of paragraphs A7.2.1-A7.2.3, wherein the visual alert comprises a visual change of a stopped game reel not leading to a payout.

A7.2.2. The gaming apparatus of any of paragraphs A7.2-A7.2.1.4, wherein the controller is further configured to:

audibly alert the user that a change in the payout scheme has occurred and/or that a/the player is provided with the subsequent opportunity.

A7.3. The gaming apparatus of any of paragraphs A7-A7.2.2, further comprising:

a memory device configured to store data related to the game reels, the data comprising arrangements of symbols associated with each of the game reels.

A7.4. The gaming apparatus of any of paragraphs A7-A7.3, further comprising:

game circuitry configured to receive a wager signal to initiate a play in response to placement of a wager, the wager decreasing the credit balance.

B. A reel-based wagering game method, the method comprising:

(1) displaying changing reels, wherein the changing reels comprise at least a first reel, a second reel, and one or more additional reels;

(2) stopping the changing reels to display stopped reels, wherein the stopped reels comprise at least a stopped first reel, a stopped second reel, and one or more additional stopped reels, and wherein each stopped reel comprises displayed game symbols;

(3) determining if the displayed game symbols of the stopped first reel and the displayed game symbols of the stopped second reel correspond to a first predetermined arrangement of game symbols that lead to a payout condition;

(4) responsive to the displayed game symbols of the stopped first reel and the displayed game symbols of the stopped second reel not corresponding to the first predetermined arrangement of game symbols:

(4a) altering the payout condition to a first altered payout condition;

(4b) determining if the displayed game symbols of the stopped second reel and the displayed game symbols of the one or more additional stopped reels correspond to a second predetermined arrangement of game symbols that lead to the first altered payout condition;

(4c) responsive to the displayed game symbols of the stopped second reel and the displayed game symbols of the one or more additional stopped reels not corresponding to the second predetermined arrangement of game symbols, altering the payout condition to a second altered payout condition; and (4d) responsive to the displayed game symbols of the stopped second reel and the displayed game symbols of the one or more additional stopped reels corresponding to the second predetermined arrangement of game symbols, not altering the payout condition;

(5) responsive to the displayed game symbols of the first stopped reel and the displayed game symbols of the second stopped reel corresponding to the first predetermined arrangement of game symbols:

(5a) not altering the payout condition;

(5b) determining if the displayed game symbols of the stopped first reel, the displayed game symbols of the stopped second reel, and the displayed game symbols of the one or more additional stopped reels correspond to the first predetermined arrangement of game symbols;

(5c) responsive to the displayed game symbols of the stopped first reel, the displayed game symbols of the stopped second reel, and the displayed game symbols of the one or more additional stopped reels not corresponding to the first predetermined arrangement of game symbols:

(5c1) altering the payout condition to a third altered payout condition;

(5c2) determining if the displayed game symbols of the stopped second reel and the displayed game symbols of the one or more additional stopped reels correspond to a third predetermined arrangement of game symbols that lead to the third altered payout condition;

(5c3) responsive to the displayed game symbols of the stopped second reel and the displayed game symbols of the one or more additional stopped reels not corresponding to the third predetermined arrangement of game symbols, altering the payout condition to a fourth altered payout condition or ending the game with no payout; and (5c4) responsive to the displayed game symbols of the stopped second reel and the displayed game symbols of the one or more additional stopped reels corresponding to the third predetermined arrangement of game symbols, not altering the payout condition; and (5d) responsive to the displayed game symbols of the stopped first reel, the displayed game symbols of the stopped second reel, and the displayed game symbols of the one or more additional stopped reels corresponding to the first predetermined arrangement of game symbols, not altering the payout condition.

B1. The reel-based wagering game method of paragraph B, further comprising:

receiving physical currency or currency based structure;

increasing a credit balance based on receipt of the physical currency or the currency based structure; and receiving an input to cause initiation of a payout associated with the credit balance.

B2. The reel-based wagering game method of any of paragraphs B-B1, wherein step (4a) further comprises alerting a player that the payout condition is altered to the first altered payout condition;

wherein step (4c) further comprises alerting the player that the payout condition is altered to the second altered payout condition; and wherein step (5c1) further comprises alerting the player that the payout condition is altered to the third altered payout condition.

B2.1. The reel-based wagering game method of paragraph B2, wherein the alertings each comprise visually alerting.

B2.1.1. The reel-based wagering game method of paragraph B2.1, wherein the visual alerting comprises one or more of:

displaying a symbol;

changing a size of at least a subset of the stopped reels that led to the alerting;

visually separating at least a subset of the stopped reels that led to the alerting and adjacent game reels; and visually changing at least a subset of the stopped reels that led to the alerting.

B3. The reel-based wagering game method of any of paragraphs B-B2.1.1, wherein the determinings are based on the displayed game symbols of stopped reels corresponding to one or more paylines or one or more multi-way payout schemes.

B4. The reel-based wagering game method of any of paragraphs B-B3 implemented on a gaming apparatus, wherein the gaming apparatus comprises one or more of a game display, a user interface, a controller, a wager input device, and a cashout device configured to perform one or more of the recited steps.

C. A gaming apparatus, comprising:

a game display;

a wager input device structured to receive physical currency or currency based structure, the currency or currency based structure establishing a credit balance, the credit balance being increasable and decreasable based at least on wagering activity;

a cashout device configured to receive an input to cause an initiation of a payout associated with the credit balance; and a controller programmed to implement the method of any of paragraphs B-B4, wherein step (1) comprises displaying the changing reels on the game display, and wherein step (2) comprises stopping the changing reels to display stopped reels on the game display.

D. A gaming apparatus configured to implement a reel-based wagering game, the gaming apparatus comprising:

a game display configured to display at least a portion of game reels of the reel-based wagering game;

a user interface configured to receive user input for controlling and engaging with the reel-based wagering game;

a wager input device structured to receive physical currency or currency based structure, the currency or currency based structure establishing a credit balance, the credit balance being increasable and decreasable based at least on wagering activity received from a player via the user interface;

a cashout device configured to receive an input to cause an initiation of a payout associated with the credit balance; and a controller operably coupled to the game display, the user interface, the wager input device, and the cashout device, wherein the controller is operable to:

responsive at least to initiation of a play, cause the game display to display the game reels as spinning game reels or changing game reels;

cause the game display to display a first set of the game reels as stopped reels;

evaluate whether the first set of the game reels corresponds to a first payout condition;

responsive to the first set of the game reels not corresponding to the first payout condition:

alert the player of a first subsequent opportunity for payout based on then spinning game reels or then changing game reels;

cause the game display to display a second set of the game reels as stopped reels; and evaluate whether the second set of the game reels corresponds to a second payout condition;

responsive to the first set of the game reels corresponding to the first payout condition:

cause the game display to display one or more additional game reels as stopped reels;

evaluate whether the first set of the game reels and the one or more additional game reels correspond to the first payout condition;

responsive to the first set of the game reels and the one or more additional game reels not corresponding to the first payout condition, alert the player of a second subsequent opportunity for payout based on then spinning game reels or then changing game reels; and responsive to the first set of the game reels and the one or more additional game reels corresponding to the first payout condition, cause the game display to display one or more yet additional game reels as stopped reels.

D1. The gaming apparatus of paragraph D, wherein the first set of game reels and the second set of game reels share at least one common reel.

D1.1. The gaming apparatus of paragraph D1, wherein cause the game display to display the first set of the game reels as stopped reels comprises cause the game display to sequentially display the game reels of the first set of the game reels as stopped reels;

wherein cause the game display to display the second set of the game reels as stopped reels comprises cause the game display to sequentially display the game reels of the second set of the game reels as stopped reels; and wherein the at least one common reel comprises a sequentially last game reel of the first set of the game reels to stop and a sequentially first game reel of the second set of the game reels to stop.

D2. The gaming apparatus of any of paragraphs D-D1.1, wherein alert the player of the first subsequent opportunity for payout comprises cause the game display to display a visual alert.

D2.1. The gaming apparatus of paragraph D2, wherein the visual alert comprises a symbol.

D2.2. The gaming apparatus of any of paragraphs D2-D2.1, wherein the visual alert comprises a change in size of at least one of the game reels of the first set of the game reels.

D2.3. The gaming apparatus of any of paragraphs D2-D2.2, wherein the visual alert comprises a visual separation between at least a subset of the first set of the game reels and an adjacent game reel of the second set of the game reels.

D2.4. The gaming apparatus of any of paragraphs D2-D2.3, wherein the visual alert comprises a visual change of at least a subset of the first set of the game reels.

D3. The gaming apparatus of any of paragraphs D-D2.4, wherein alert the player of the first subsequent opportunity for payout comprises cause the gaming apparatus to audibly alert the player.

D4. The gaming apparatus of any of paragraphs D-D3, wherein the first payout condition is associated with one or more paylines that span the first set of game reels, and wherein the second payout condition is associated with one or more paylines that span the second set of game reels.

D5. The gaming apparatus of any of paragraphs D-D4, wherein the first payout condition is associated with a first multi-way payout scheme that spans the first set of game reels, and wherein the second payout condition is associated with a second multi-way payout scheme that spans the second set of game reels.

D6. The gaming apparatus of any of paragraphs D-D5, wherein the controller is further operable to:

receive a signal from the wager input device indicating receipt of the physical currency or the currency based structure; and increase the credit balance based on a currency value associated with the physical currency or the currency based structure.

D7. The gaming apparatus of any of paragraphs D-D6, wherein the controller is further operable to:

receive a wager from the player on a game event, the wager decreasing the credit balance.

E. A reel-based wagering game, comprising:

a number of reels; and multiple paylines associated with the number of reels, wherein evaluation of payouts associated with the multiple paylines starts with a first reel to stop and resets at a subsequent reel to stop when the subsequent reel does not result in a payout with previously stopped reels.

E1. The reel-based wagering game of paragraph E, further comprising any suitable subject matter of any of paragraphs A-D7.

F. A reel-based wagering game, comprising:

a number of reels; and a multi-way payout scheme associated with the number of reels, wherein evaluation of payouts associated with the multi-way payout scheme starts with a first reel to stop and resets at a subsequent reel to stop when the subsequent reel does not result in a payout with previously stopped reels.

F1. The reel-based wagering game of paragraph F, further comprising any suitable subject matter of any of paragraphs A-D7.

G. A gaming apparatus configured to implement a reel-based wagering game, the gaming apparatus comprising:

a game display; and a controller programmed to:

display, on the game display, a number of game reels; and evaluate payout conditions based on multiple paylines or a multi-way payout scheme associated with the number of game reels, wherein evaluation of the payout conditions starts with a first reel to stop and resets at a subsequent reel to stop when the subsequent reel does not result in a payout with previously stopped reels.

G1. The gaming apparatus of paragraph G1, further comprising:

a wager input device structured to receive wagering activity from a player; and wherein the controller is further configured to increase and decrease a credit balance based on the wagering activity and based on payouts resulting from evaluations of the payout conditions.

G2. The gaming apparatus of any of paragraphs G-G1, further comprising any suitable subject matter of any of paragraphs A-F1.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A reel-based wagering game method implemented on a gaming apparatus comprising a game display, a user interface, and a controller, the reel-based wagering game method comprising:

(1) displaying, by the game display, changing reels, wherein the changing reels comprise at least a first reel, a second reel, and one or more additional reels;

(2) stopping, by the controller, the changing reels to display, by the game display, stopped reels, wherein the stopped reels comprise at least a stopped first reel, a stopped second reel, and one or more additional stopped reels, and wherein each stopped reel comprises displayed game symbols;

(3) evaluating, by the controller, whether the displayed game symbols of the stopped first reel and the displayed game symbols of the stopped second reel correspond to a first predetermined arrangement of game symbols that lead to a payout condition;

(4) only responsive to the displayed game symbols of the stopped first reel and the displayed game symbols of the stopped second reel not corresponding to the first predetermined arrangement of game symbols:

(4a) altering, by the controller, the payout condition to a first altered payout condition;

(4b) evaluating, by the controller, whether the displayed game symbols of only the stopped second reel and the one or more additional stopped reels correspond to a second predetermined arrangement of game symbols that lead to the first altered payout condition;

(4c) responsive to the displayed game symbols of the stopped second reel and the displayed game symbols of the one or more additional stopped reels not corresponding to the second predetermined arrangement of game symbols, altering, by the controller, the payout condition to a second altered payout condition; and (4d) responsive to the displayed game symbols of the stopped second reel and the displayed game symbols of the one or more additional stopped reels corresponding to the second predetermined arrangement of game symbols, not altering, by the controller, the payout condition;

(5) responsive to the displayed game symbols of the first stopped reel and the displayed game symbols of the second stopped reel corresponding to the first predetermined arrangement of game symbols:

(5a) not altering, by the controller, the payout condition;

(5b) evaluating, by the controller, whether the displayed game symbols of the stopped first reel, the displayed game symbols of the stopped second reel, and the displayed game symbols of the one or more additional stopped reels correspond to the first predetermined arrangement of game symbols;

(5c) only responsive to the displayed game symbols of the stopped first reel, the displayed game symbols of the stopped second reel, and the displayed game symbols of the one or more additional stopped reels not corresponding to the first predetermined arrangement of game symbols:

(5c1) altering, by the controller, the payout condition to a third altered payout condition;

(5c2) evaluating, by the controller, whether the displayed game symbols of only the stopped second reel and the one or more additional stopped reels correspond to a third predetermined arrangement of game symbols that lead to the third altered payout condition;

(5c3) responsive to the displayed game symbols of the stopped second reel and the displayed game symbols of the one or more additional stopped reels not corresponding to the third predetermined arrangement of game symbols, altering, by the controller, the payout condition to a fourth altered payout condition or ending the game with no payout; and (5c4) responsive to the displayed game symbols of the stopped second reel and the displayed game symbols of the one or more additional stopped reels corresponding to the third predetermined arrangement of game symbols, not altering, by the controller, the payout condition; and (5d) responsive to the displayed game symbols of the stopped first reel, the displayed game symbols of the stopped second reel, and the displayed game symbols of the one or more additional stopped reels corresponding to the first predetermined arrangement of game symbols, not altering, by the controller, the payout condition.

2. The reel-based wagering game method of claim 1, wherein the gaming apparatus further comprises a wager input device, and a cashout device, the reel-based wagering game method further comprising:

receiving, by the wager input device from a player, physical currency or currency based structure;

increasing, by the controller, a credit balance based on receipt of the physical currency or the currency based structure; and receiving an input, by the user interface from the player, to cause initiation of a payout, by the cashout device, associated with the credit balance.

3. The reel-based wagering game method of claim 1, wherein step (4a) further comprises alerting, by the gaming apparatus, a player that the payout condition is altered to the first altered payout condition;

wherein step (4c) further comprises alerting, by the gaming apparatus, the player that the payout condition is altered to the second altered payout condition; and wherein step (5c1) further comprises alerting, by the gaming apparatus, the player that the payout condition is altered to the third altered payout condition.

4. The reel-based wagering game method of claim 3, wherein the alertings each comprise visually alerting, and wherein the visual alerting comprises one or more of:

displaying, by the game display, a symbol;

changing, by the game display, a size of at least a subset of the stopped reels that led to the alerting;

visually separating, by the game display, at least a subset of the stopped reels that led to the alerting and adjacent game reels; and visually changing, by the game display, at least a subset of the stopped reels that led to the alerting.

5. The reel-based wagering game method of claim 1, wherein the evaluatings are based on the displayed game symbols of stopped reels corresponding to one or more paylines.

6. A gaming apparatus configured to implement a reel-based wagering game, the gaming apparatus comprising:

a game display configured to display at least a portion of game reels of the reel-based wagering game;

a user interface configured to receive user input for controlling and engaging with the reel-based wagering game;

a wager input device structured to receive physical currency or currency based structure, the currency or currency based structure establishing a credit balance, the credit balance being increasable and decreasable based at least on wagering activity received from a player via the user interface;

a cashout device configured to receive an input to cause an initiation of a payout associated with the credit balance; and a controller operably coupled to the game display, the user interface, the wager input device, and the cashout device, wherein the controller is operable to:

responsive at least to initiation of a play, cause the game display to display the game reels as spinning game reels or changing game reels;

cause the game display to display a first set of the game reels as stopped reels;

evaluate whether the first set of the game reels corresponds to a first payout condition;

only responsive to the first set of the game reels not corresponding to the first payout condition:

alert the player of a first subsequent opportunity for payout based on then spinning game reels or then changing game reels;

cause the game display to display a second set of the game reels as stopped reels; and evaluate whether only the second set of the game reels corresponds to a second payout condition;

responsive to the first set of the game reels corresponding to the first payout condition:

cause the game display to display one or more additional game reels as stopped reels;

evaluate whether the first set of the game reels and the one or more additional game reels correspond to the first payout condition;

only responsive to the first set of the game reels and the one or more additional game reels not corresponding to the first payout condition, alert the player of a second subsequent opportunity for payout based on then spinning game reels or then changing game reels; and responsive to the first set of the game reels and the one or more additional game reels corresponding to the first payout condition, cause the game display to display one or more yet additional game reels as stopped reels.

7. The gaming apparatus of claim 6, wherein the first set of game reels and the second set of game reels share at least one common reel.

8. The gaming apparatus of claim 7, wherein cause the game display to display the first set of the game reels as stopped reels comprises cause the game display to sequentially display the game reels of the first set of the game reels as stopped reels;

wherein cause the game display to display the second set of the game reels as stopped reels comprises cause the game display to sequentially display the game reels of the second set of the game reels as stopped reels; and wherein the at least one common reel comprises a sequentially last game reel of the first set of the game reels to stop and a sequentially first game reel of the second set of the game reels to stop.

9. The gaming apparatus of claim 6, wherein alert the player of the first subsequent opportunity for payout comprises cause the game display to display a visual alert.

10. The gaming apparatus of claim 9, wherein the visual alert comprises a symbol.

11. The gaming apparatus of claim 9, wherein the visual alert comprises a change in size of at least one of the game reels of the first set of the game reels.

12. The gaming apparatus of claim 9, wherein the visual alert comprises a visual separation between at least a subset of the first set of the game reels and an adjacent game reel of the second set of the game reels.

13. The gaming apparatus of claim 9, wherein the visual alert comprises a visual change of at least a subset of the first set of the game reels.

14. The gaming apparatus of claim 6, wherein alert the player of the first subsequent opportunity for payout comprises cause the gaming apparatus to audibly alert the player.

15. The gaming apparatus of claim 6, wherein the first payout condition is associated with one or more paylines that span the first set of game reels, and wherein the second payout condition is associated with one or more paylines that span the second set of game reels.

16. The gaming apparatus of claim 6, wherein the first payout condition is associated with a first multi-way payout scheme that spans the first set of game reels, and wherein the second payout condition is associated with a second multi-way payout scheme that spans the second set of game reels.

17. The gaming apparatus of claim 6, wherein the controller is further operable to:

receive a signal from the wager input device indicating receipt of the physical currency or the currency based structure; and increase the credit balance based on a currency value associated with the physical currency or the currency based structure.

18. The gaming apparatus of claim 6, wherein the controller is further operable to:

receive a wager from the player on a game event, the wager decreasing the credit balance.

19. A gaming apparatus configured to implement a reel-based wagering game, the gaming apparatus comprising:

a game display; and a controller programmed to:

display, on the game display, a number of game reels; and evaluate payout conditions based on multiple paylines or a multi-way payout scheme associated with the number of game reels, wherein evaluation of the payout conditions starts with a first reel to stop and resets at a subsequent reel to stop only when the subsequent reel does not result in a payout with previously stopped reels.

20. The gaming apparatus of claim 19, further comprising:

a wager input device structured to receive wagering activity from a player; and wherein the controller is further configured to increase and decrease a credit balance based on the wagering activity and based on payouts resulting from evaluations of the payout conditions.

* * * * *